US012192358B1

(12) United States Patent
Loladia

(10) Patent No.: US 12,192,358 B1
(45) Date of Patent: *Jan. 7, 2025

(54) IDENTITY TOKEN FOR ACCESSING COMPUTING RESOURCES

(71) Applicant: Amazon Technologies, Inc., Seattle, WA (US)

(72) Inventor: Rameez Loladia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/478,499

(22) Filed: Sep. 17, 2021

Related U.S. Application Data

(62) Division of application No. 15/686,013, filed on Aug. 24, 2017, now Pat. No. 11,128,464.

(51) Int. Cl.
| | |
|---|---|
| *H04L 9/32* | (2006.01) |
| *G06F 21/34* | (2013.01) |
| *H04L 9/08* | (2006.01) |
| *G06F 21/62* | (2013.01) |
| *H04W 12/06* | (2021.01) |

(52) U.S. Cl.
CPC ............ *H04L 9/3213* (2013.01); *G06F 21/34* (2013.01); *H04L 9/08* (2013.01); *H04L 9/3234* (2013.01); *G06F 21/62* (2013.01); *H04W 12/06* (2013.01)

(58) Field of Classification Search
CPC ....... H04L 9/3213; H04L 9/08; H04L 9/3234; H04L 63/0807; H04L 63/10; G06F 21/34; G06F 21/62; G06F 21/335; H04W 12/06
See application file for complete search history.

(56) References Cited

U.S. PATENT DOCUMENTS

| | | | |
|---|---|---|---|
| 8,584,211 B1 | 11/2013 | Vetter et al. | |
| 8,656,002 B1 * | 2/2014 | Adogla | G06F 21/62 709/224 |
| 10,691,820 B1 | 6/2020 | Blum et al. | |
| 2001/0023487 A1 * | 9/2001 | Kawamoto | H04L 63/04 726/28 |
| 2005/0204148 A1 | 9/2005 | Mayo et al. | |

(Continued)

OTHER PUBLICATIONS

Azeem Ahmad et al. "A Multi=Token Authorization Strategy for Secure Mobile Cloud Computing," pp. 136-141, 2014. (Year: 2014).*

(Continued)

*Primary Examiner* — Luu T Pham
*Assistant Examiner* — Canh Le
(74) *Attorney, Agent, or Firm* — Davis Wright Tremaine LLP

(57) ABSTRACT

A technology is described for device communication with computing regions. An example method may include receiving at a first computing region a request for a computing resource. In response to receiving the request, a device associated with the request may be authenticated using authentication credentials for the device. An identity token that indicates permission for the device to access the computing resource in a second computing region may be generated and the identity token and instructions to connect to the second computing region may be provided to the device. The device may present the identity token to the second computing region in order to access the computing resource in the second computing region.

20 Claims, 16 Drawing Sheets

(56) References Cited

U.S. PATENT DOCUMENTS

| | | | |
|---|---|---|---|
| 2007/0078860 A1* | 4/2007 | Enenkiel | H04L 67/1008 |
| 2008/0072301 A1 | 3/2008 | Chia et al. | |
| 2009/0135700 A1* | 5/2009 | Fujibayashi | G11B 17/228 |
| | | | 369/85 |
| 2010/0138475 A1* | 6/2010 | Frank | H04L 47/125 |
| | | | 709/224 |
| 2010/0312891 A1 | 12/2010 | Pairault et al. | |
| 2012/0008535 A1 | 1/2012 | Kuehnel | |
| 2012/0110151 A1* | 5/2012 | Moore | G06F 9/526 |
| | | | 709/223 |
| 2013/0339527 A1 | 12/2013 | Chowdhry | |
| 2014/0109178 A1 | 4/2014 | Barton et al. | |
| 2014/0343999 A1 | 11/2014 | Kim et al. | |
| 2015/0089569 A1* | 3/2015 | Sondhi | H04L 63/10 |
| | | | 726/4 |
| 2016/0028737 A1* | 1/2016 | Srinivasan | H04L 63/0807 |
| | | | 726/4 |
| 2016/0043970 A1 | 2/2016 | Jacob et al. | |
| 2016/0134617 A1 | 5/2016 | Mani et al. | |
| 2016/0277400 A1 | 9/2016 | Maurya et al. | |
| 2016/0380989 A1 | 12/2016 | Bailey et al. | |
| 2017/0213206 A1 | 7/2017 | Shearer | |
| 2017/0223138 A1 | 8/2017 | Amiri et al. | |
| 2017/0250964 A1* | 8/2017 | Edwards | H04L 63/20 |
| 2017/0331921 A1 | 11/2017 | Moreira da Mota et al. | |
| 2017/0339228 A1 | 11/2017 | Azgin et al. | |
| 2018/0077143 A1* | 3/2018 | Sridharan | H04L 63/0807 |
| 2018/0211055 A1* | 7/2018 | Balijepalli | H04L 9/3247 |
| 2018/0248882 A1 | 8/2018 | Krauss | |
| 2018/0367311 A1* | 12/2018 | Stahlberg | H04L 9/3234 |

OTHER PUBLICATIONS

Zombo Fu et al., "Application Independent Identity Management," pp. 625-628, 2010 (Year: 2010).*

Agale, "Securing the Cloud Resources Using Atribute Based Access Control," International Journal of Computer Science Trends and Technology, Feb. 2016, 4 pages.

Koshutanski et al., "Distributed Identity Management Model for Digital Ecosystems," International Conferen on Emerging Security Information, Systems and Technologies, 2007, 7 pages.

* cited by examiner

IDENTITY TOKEN FOR ACCESSING COMPUTING RESOURCES

CROSS-REFERENCE TO RELATED APPLICATIONS

This application is a divisional of U.S. application Ser. No. 15/686,013, entitled "IDENTITY TOKEN FOR ACCESSING COMPUTING RESOURCES," filed on Aug. 24, 2017, now U.S. Pat. No. 11,128,464, issued on Sep. 21, 2021, the disclosure of which is incorporated herein by reference for all purposes.

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems (HVAC), and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances offer the possibility of being configured with communication capabilities for the purpose of transmitting status and receiving external control communications.

DETAILED DESCRIPTION

Figure 1A:
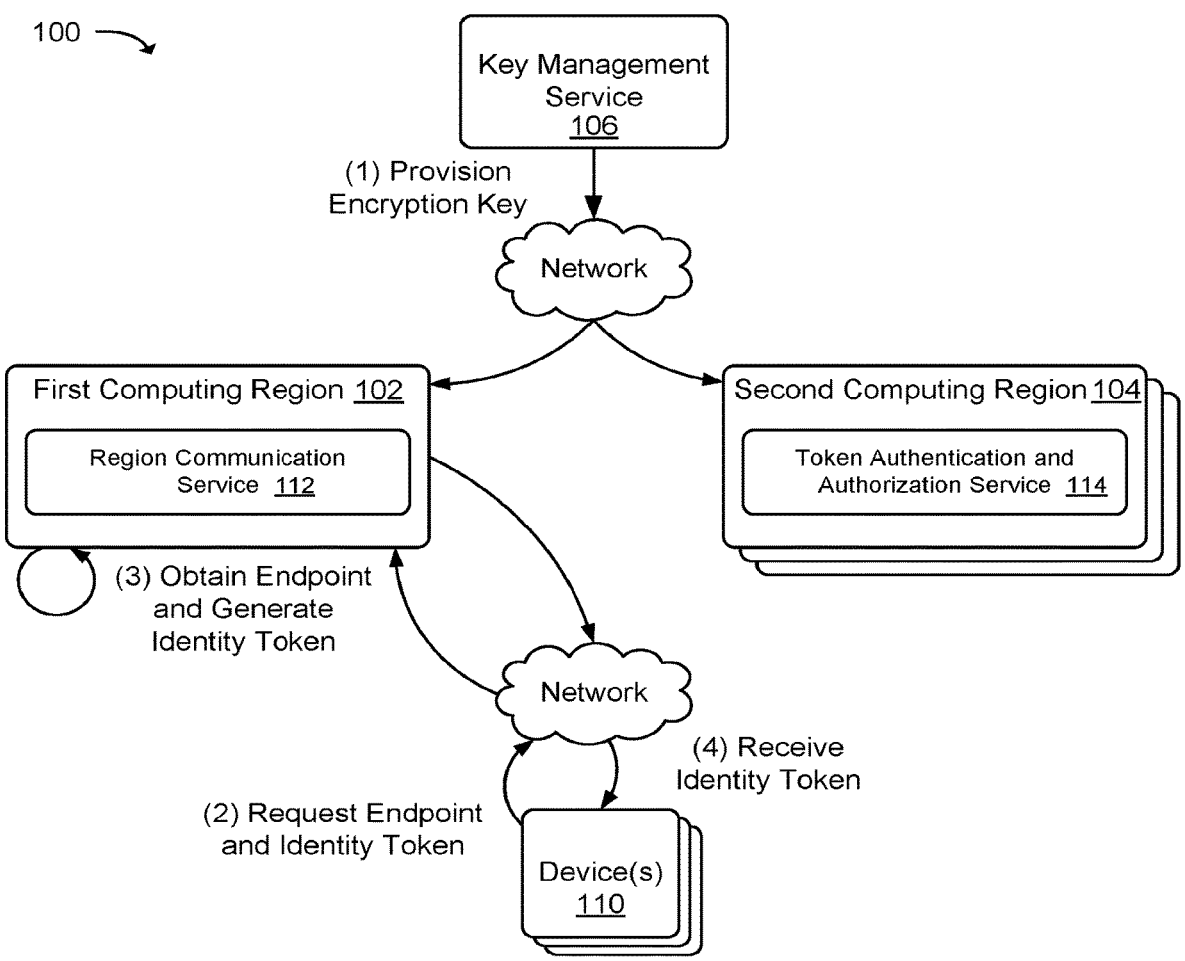
FIGS. 1A-B are diagrams illustrating a system and method for device communication with computing regions using an identity token that allows a device registered with a first computing region to communicate with a second computing region.

A technology is described for device communication with computing regions. In one aspect of the technology, a device registered with a first computing region may be allowed to communicate with and use the computing services or operations of a second computing region by obtaining an identity token from the first computing region and presenting the identity token to the second computing region. An example of a device that may request to communicate with and use the services of the computing region may be an IoT (Internet of Things) device or an embedded system. The identity token may indicate that the device is authorized to communicate with the second computing region and the identity token may include permissions for accessing computing resources included in the second computing region. The identity token may be signed by the first computing region using an encryption key (e.g., a private key), and the identity token may be authenticated by the second computing region using a copy of the encryption key.

In another aspect of the technology, a device registered with a first computing region may be allowed to migrate to a second computing region by obtaining an identity token from the first computing region and presenting the identity token to the second computing region. The identity token may indicate that the device is authorized to migrate to the second computing region and the identity token may include registration information for the device that can be used to create a registration record for the device with the second computing region or transfer a registration record from the first computing region. The identity token may be signed by the first computing region using an encryption key (e.g., private key), and the identity token may be authenticated by the second computing region using a copy of the encryption key.

A device may be one of many physical electronic devices that create a large network of addressable devices. This entire "network" is commonly referred to as the Internet of Things (IoT). The devices making up the network may be addressable over a computer network and/or eventually addressable (e.g., capable of receiving relayed messages sent over a computer network). A device may be registered with a computing region configured to provide devices with computing services or resources, such as, but not limited to applications and managed services (e.g., a message broker service, a device representation service, data storage services, computing services, networking services, and other services in a device management service) over a computer network.

A computing region may be able to support billions of devices and trillions of messages that may be processed and routed to service endpoints and devices. In one example, a computing region may provide computing resources with reduced latency to devices located in a defined geographical area. For example, a data center located in a defined geographical area (e.g., US East, US South, or US West) may host a device management service configured to provide device services from a computing region to devices located in the defined geographical area. The device management service may be replicated across data centers located in separate geographical areas, thereby creating computing regions in the separate geographical areas that include instances of the device management service. In another example, a data center may host multiple instances of the device management service. Each instance of the device management service may comprise a computing region with separate registration, authentication, security, and services for the computing region and devices can be assigned to the computing region in order to reduce latency for the device.

A computing region may be configured to perform device authentication and authorization at points of connection to the computing region. Devices registered with the computing region are allowed to connect to the computing region and request that an operation or service be performed in the computing region via the device authentication and authorization services. In the past, devices not registered with a computing region were not allowed to connect to the computing region and request that an operation be performed in the computing region. The present technology allows a device which is not registered with a computing region to obtain an identity token indicating that the device is authorized to request the performance of a specified operation in the computing region and present the identity token to the computing region for access. The identity token presented by the device may be authenticated and the specified operation may be performed in the computing region. Using the identity token, registration of the device in multiple computing regions may be avoided, such that maintaining registration records and security credentials across multiple computing regions may not be needed.

Figure 1B:
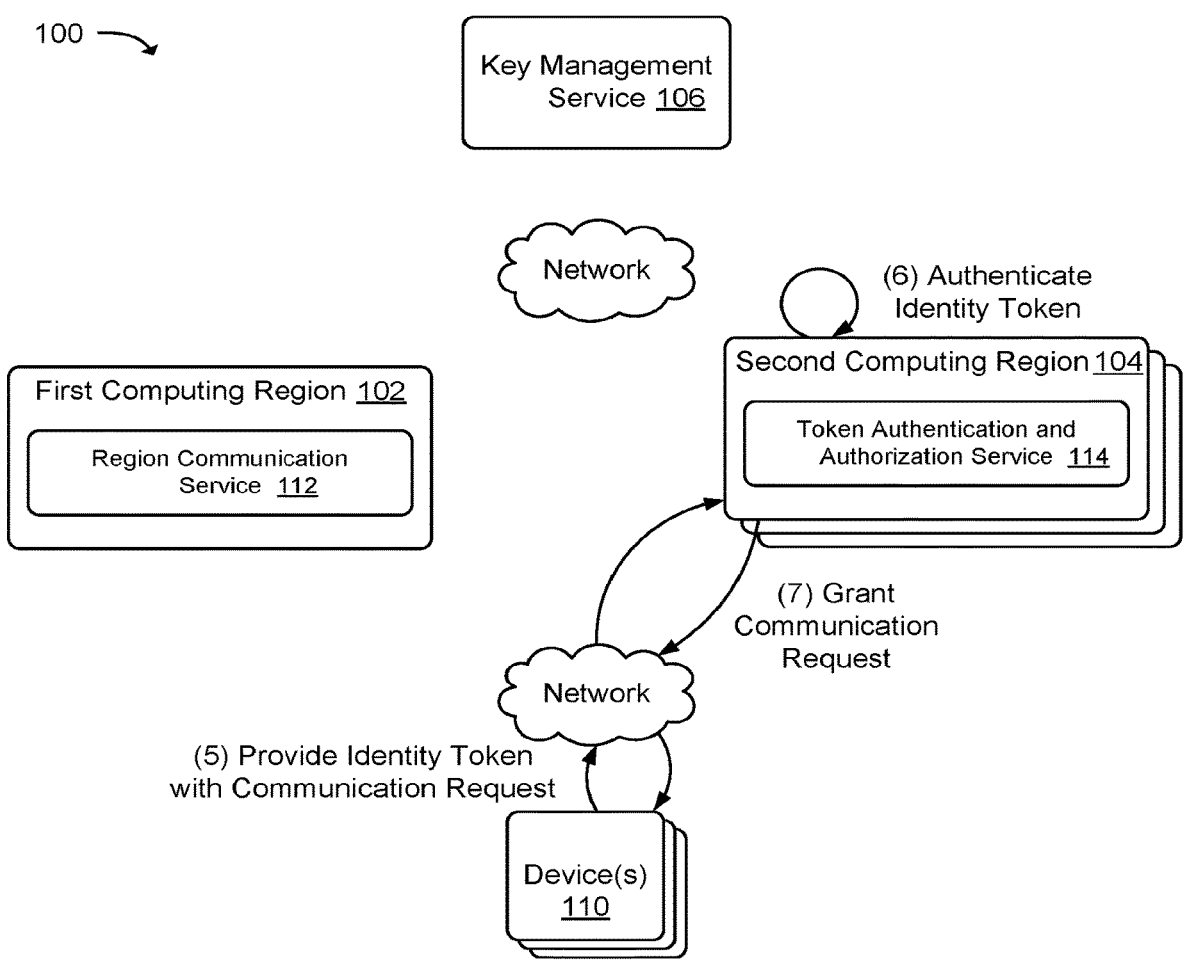

To further describe the present technology, examples are now provided with reference to the figures. FIGS. 1A-B are diagrams illustrating high level examples of a system 100 and method for device communication with a first computing region 102 and a second computing region 104 using an identity token that allows a device 110 registered with the first computing region 102 to communicate with the second computing region 104. The first computing region 102 and the second computing region 104 are examples of computing regions that may provide a device management service to devices 110 which connect to various computing resources made accessible to the devices 110 through the computing regions. In one example, the computing regions may include geographically dispersed data centers that host an instance of the device management service. In another example, computing regions may be non-geographic. For example, a data center may host multiple instances of the device management service where each instance hosted by the data center comprises a computing region. Devices 110 may be assigned to one of the computing regions based on non-geographic factors (e.g., based on a device type, a communication protocol used by devices 110, randomly, etc.).

In the example illustrated, a device 110 may be registered with a first computing region 102. More specifically, the first computing region 102 may include a device registry (shown in FIG. 3A) that contains a registration record for the device 110 that allows the device 110 to connect to the first computing region 102 via a network and access computing resources provided by the first computing region 102. In the example illustrated in FIG. 1A, the device 110 is not registered with a second computing region 104. Therefore, in order to communicate with the second computing region 104, the device 110 obtains an identity token from the first computing region 102 that allows the device 110 to communicate with the second computing region 104 by presenting the identity token to the second computing region 104.

A device 110 may communicate with a second computing region 104 for various reasons. For example, the device 110 may connect to a second computing region 104 in order to access computing resources provided by the second computing region 104. For example, the computing resource services in the first computing region 102 may not be available in the second computing region 104, or the computing resource services in the first computing region 102 may be configured differently or have different data stores than in the second computing region 104. As one non-limiting example, a device 110 may connect to a second computing region and publish a message to a topic or subscribe to a topic (e.g., a named logical channel in a publish-subscribe messaging system) in the second computing region 104. For example, a weather station device (e.g., a temperature sensor, moisture sensor, wind sensor, or the like) registered with a first computing region 102 in the Eastern United States may connect to a second computing region 104 for the Western United States and publish weather data to a weather topic for weather in the Eastern United States. As another non-limiting example, a device 110 may connect to a second computing region to retrieve, update, or delete a device representation configured to represent a state of the device 110 in the second computing region 104. For example, a network connected device (e.g., door lock, light, watering system, and the like) registered with a first computing region 102 in the Eastern United States may connect to a second computing region 104 for the Western United States and update a device representation for a network connected device to a last known state (e.g., "open" or "closed", "on" or "off", "active" or "dormant", etc.) of the network connected device, allowing, for example, a landlord to monitor the state of the network connected device using the computing resources of the second computing region 104.

A device 110, registered with a first computing region 112, may obtain permission to connect to a second computing region 104 by requesting that the first computing region 102 provide the device 110 with an identity token. An identity token request may include an identifier for a second computing region 104 and information for an operation to be performed in the second computing region 104. The identifier for the second computing region 104 included in the identity token request may be used to determine whether the device 110 is authorized to communicate with the second computing region 104. Illustratively, an operation to be performed may include subscribing to, and/or publishing to, a topic in a second computing region 104, or accessing a device representation in the second computing region 104 that represents a last known state of a device 110.

In one example, an identifier for a second computing region 104 included in an identity token request may be used to obtain an endpoint for the second computing region 104 and the endpoint may be provided to a device 110 requesting the identity token. The device 110 may use the endpoint to connect to the second computing region 104 and request access to computing resources included in the second computing region 104 using the identity token. An endpoint for a second computing region 104 may be a reference (e.g., a URL (Uniform Resource Locator)) to an entry point for the second computing region 104. In one example, a device 110 may obtain a listing of computing regions that may be accessible to the device 110 via an identity token. The device 110 may send a computing region discovery request to a first computing region 102 where the device 110 may be registered, and in response, the first computing region 102 may provide the device 110 with the listing of computing regions and corresponding endpoints (e.g., a URL of an endpoint), as described in greater detail later in association with FIG. 4. The device 110 may be configured to select an endpoint for a second computing region 104 from the listing and request an identity token from the first computing region 102 that allows the device 110 to connect to the selected second computing region 104.

In response to receiving an identity token request from a device 110 at a first computing region 102, the device 110 may be authenticated. In one example, a signed certificate may be used to authenticate the device 110. The signed certificate may be stored on the device 110 and the device 110 may include the signed certificate in requests sent to the first computing region 102. Communications between the device 110 and computing regions 102/104 may be encrypted (e.g., using TLS (Transport Layer Security). TLS client authentication may be used by computing regions 102/104 to identify devices 110. After authenticating the device 110, a determination whether the device 110 is authorized to communicate with a second computing region 104 specified in the identity token request may be made using a region communication service 112. The region communication service 112 may be configured to obtain a device policy for the device 110. The device policy may include permissions for connecting to a second computing region 104 and requesting operations (e.g., subscribe to, and publish to, a topic) in the second computing region 104. A device policy may be stored in the first computing region 102 where a device 110 is registered and the device policy may be used to manage the device 110 by specifying a second computing region 104 (or additional computing regions) that the device 110 is allowed to communicate with and which operations the device 110 is allowed to request in the second computing region 104. As an illustration, as part of receiving a request from a device 110 to connect to a second computing region 104 and publish a message to a topic in the second computing region 104, the region communication service 112 may be configured to determine whether a device policy for the device 110 includes permissions that allow the device 110 to connect to the second computing region 104 and publish messages to the topic indicated in the request.

After determining that a device policy grants a device 110 permission to connect to a second computing region 104 and to request that an operation be performed by the second computing region 104, the region communication service 112 may generate an identity token that allows the device 110 to connect to the second computing region 104 and request performance of the operation. An identity token may be generated to indicate that a device 110 is authorized to connect to a second computing region 104 and the identity token may include permissions that provide a scope of operations that can be requested by the device 110 in the second computing region 104. In one example, an identity token may be a temporary token that expires after a predetermined amount of time. For example, the identity token may expire after a few minutes or hours. In another example, an identity token may allow a one-time session with a second computing region 104. For example, the identity token may allow a device 110 to establish a one-time session with a second computing region 104, during which the device 110 may request the performance of an operation. Also, an identity token may be revoked after an occurrence of an event. For example, an identity token may be revoked after an event, such as: fulfilling a request made by a device, detecting malfeasance linked to a device, a change to security credentials for a device, a change to a device policy, a rebalancing of load distribution among computing regions, and the like.

In one example, an identity token may be signed using an encryption key provided by a key management service 106. The key management service 106 may include a centralized cryptographic key service configured to generate cryptographic keys and centrally manage the cryptographic keys. Encryption keys provided by the key management service 106 may be symmetric or asymmetric encryption keys. In one example, the key management service 106 may provision an encryption key to computing regions provided by a computing service provider (e.g., owner of the computing regions), and the computing regions may use the encryption key to sign identity tokens and authenticate the identity tokens. For example, the key management service 106 may provision an encryption key to both a first computing region 102 and a second computing region 104, such that both have a copy of the encryption key. In one example, the key management service 106 may periodically (e.g., every 60 minutes, several times a day, once a day, once a week, etc.) generate an encryption key and push the encryption key to both the first computing region 102 and the second computing region 104 using a push messaging system. In another example, encryption keys by the key management service 106 may be stored to a secure key repository that may be centrally managed by the key management service 106, and computing regions may retrieve the encryption keys from the key repository for the purpose of signing and authenticating identity tokens. Encryption keys stored in the key repository may be protected using Hardware Security Modules (HSMs).

FIG. 1B illustrates that after receiving the identity token from the region communication service, the device 110 may send the identity token and a region communication request to an endpoint for the second computing region 104. The region communication request may include a request to connect to the second computing region 104 and a request that an operation be performed using a computing resource in the second computing region 104.

The second computing region 104 may receive the region communication request from the device 110 and authenticate the identity token included in the region communication request. As illustrated, the second computing region 104 may include a token authentication and authorization service 114 that authenticates the identity token using an encryption key provided by the key management service 106. As described earlier, the key management service 106 may provide an encryption key to both the first computing region 102 and the second computing region 104. The encryption key provided by the key management service 106 may be used by the token authentication and authorization service 114 to authenticate the identity token.

After authenticating the identity token, the token authentication and authorization service 114 may evaluate permissions included in the identity token to determine whether the permissions allow an operation requested by the device 110 to be performed in the second computing region 104. The permissions included in the identity token provide a scope of operations that may be requested by the device 110. Should the identity token include permissions that allow the device 110 to request an operation, the request may be forwarded to a computing resource configured to execute the operation, otherwise, the request may be denied, and the device 110 may be sent a message indicating that the device 110 is not authorized to request the operation at the second computing region 104.

As an illustration, a region communication request received from a device 110 may include an identity token and a request to update a device representation (e.g., update a device shadow copy) managed in the second computing region 104. In response to the region communication request, the token authentication and authorization service 114 may evaluate permissions included in the identity token to determine whether the permissions allow the device 110 to update the device representation managed in the second computing region 104. In the case that the permissions allow the device 110 to update the device representation, the operation may be allowed and the device representation may be updated. In the case that the permissions do not allow the device 110 to update the device representation, the request may be denied and the device 110 may be notified.

Figure 2A:
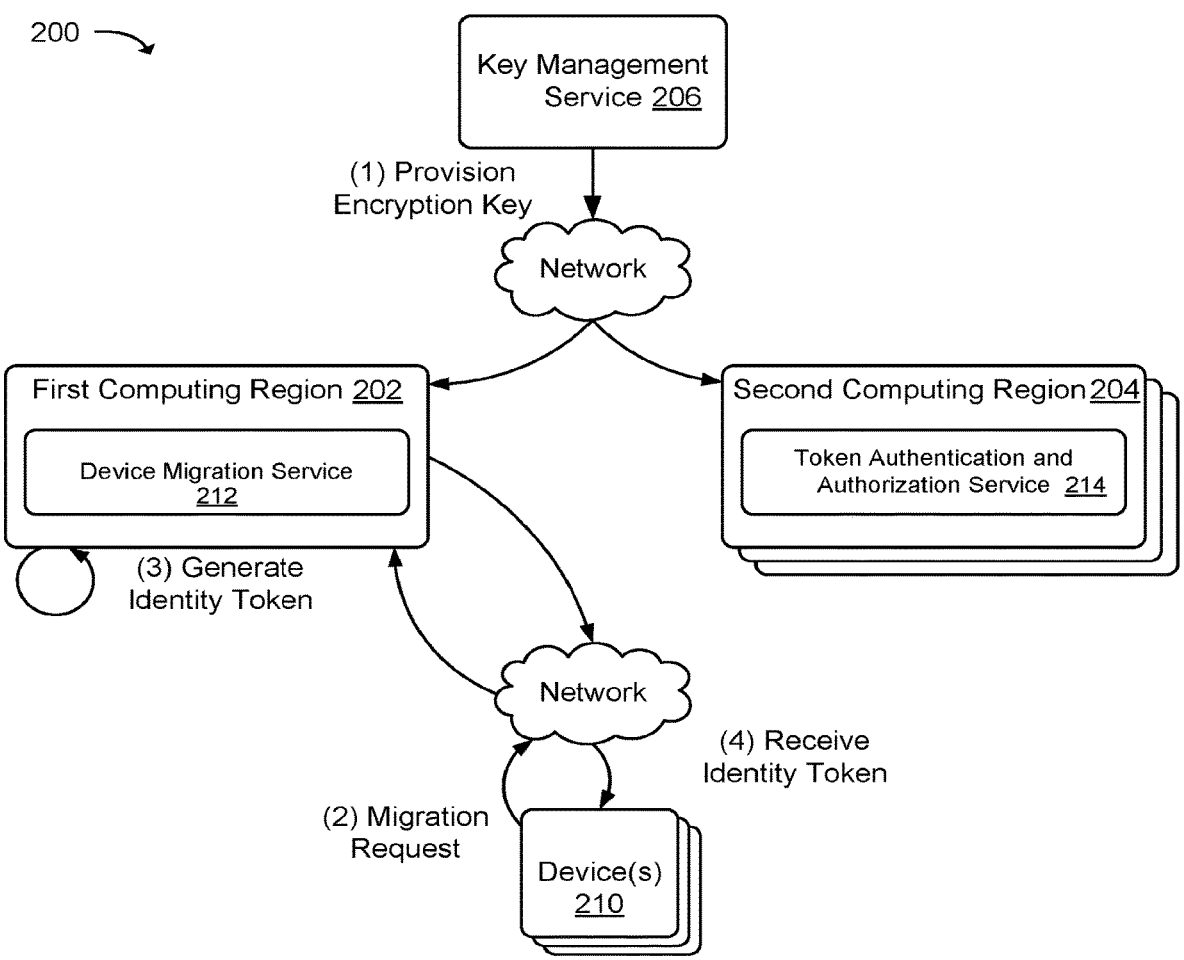
FIGS. 2A-B are diagrams that illustrate a system and method for migrating a device from a first computing region to a second computing region using an identity token.
Figure 2B:
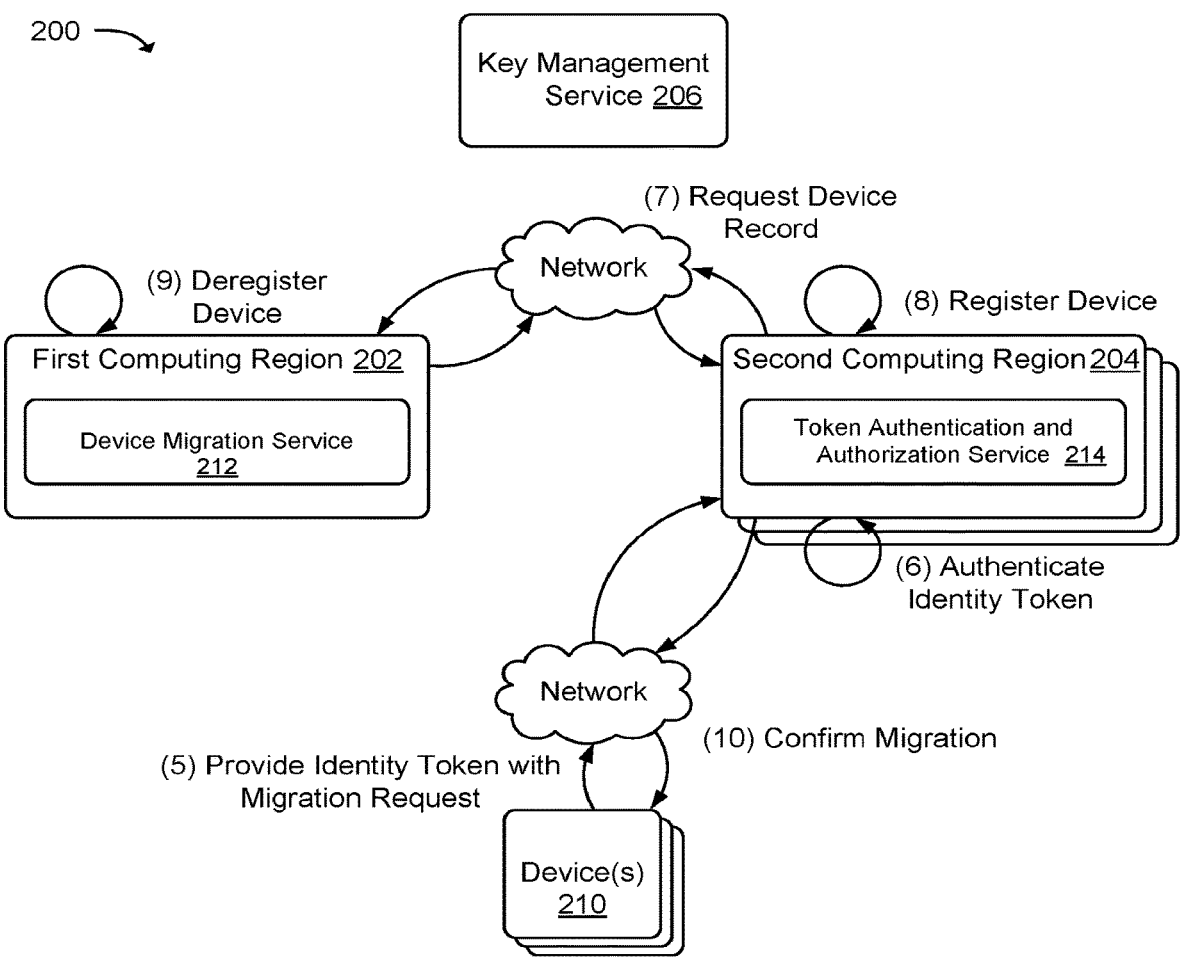

FIGS. 2A-B are diagrams illustrating a high level example of a system 200 and method for migrating a device 210 from a first computing region 202 to a second computing region 204 using an identity token. More specifically, a device 210 registered with the first computing region 202 may request an identity token from the first computing region 202 that allows the device 210 to migrate from the first computing region 202 to a second computing region 204. The first computing region 202 may provide the identity token to the device 210, and thereafter, the device 210 may present the identity token to a second computing region 204. In response, the second computing region 204 may register the device 210 with the second computing region 204 and instruct the first computing region 202 to deregister the device 210 at the first computing region 202. Registering a device 210 with a computing region 202/204 may include creating a registration record (described in FIG. 3) for the device 210 in a device registry for the computing region 202/204, and deregistering a device 210 from a computing region 202/204 may include removing a registration record for the device 210 from a device registry for the computing region 202/204.

A device 210 may migrate from one computing region to another computing region for various reasons. As one example, devices 210 manufactured in a particular geographic region (e.g., Brazil) may be registered to a first computing region 202, which is configured to provide computing services to devices 210 located in the geographical region. Thereafter, the device 210 may be shipped to a new location (e.g., Eastern United States), which may be outside of the boundaries of the first computing region 202 to which the device 210 was registered or provisioned. As part of the setup of the device 210 in the new location, the device 210 may be configured to migrate from the first computing region 202 to a second computing region 204 that provides the same computing services to devices located in the new location. As another example, a device 210, which may be mobile, may be periodically moved from one geographical region (e.g., the Western United States) to another geographical region (e.g., the Southern United States). Therefore, the device 210 may be configured to migrate from a first computing region 202 to a second computing region 204 that provide computing services to devices located in the geographical regions.

A determination whether to migrate a device 210 from a first computing region 202 to a second computing region 204 may be based in part on a current location of the device 210. In one example, a device 210 may be capable of determining the device's location (e.g., using a GPS (Global Positioning System) sensor) and provide the device's location (e.g., GPS coordinates) to a first computing region 202, with which the device 210 may be registered, along with a computing region discovery request that asks the first computing region 102 for an endpoint of a computing region (e.g., a URL of an endpoint) that provides computing resources to devices in the device's current location. In another example, a device 210 may send a computing region discovery request to a first computing region 202 where the device 210 may be registered asking that the first computing region 202 determine the device's location, using, for example, IP (Internet Protocol) detection, WI-FI access point detection, or another location detection technique.

In one example, in response to receiving a computing region discovery request at a first computing region 202 from a device 210 registered with the first computing region 202, the first computing region 202 may identify an endpoint for a computing region having a defined geographical boundary that includes the location of the device 210 and provide the device 210 with the endpoint for the computing region. In the case that the location of the device 210 is within the geographical boundaries of the first computing region 202 where the device 210 may be registered, the endpoint may be for the first computing region 202 and a determination may be made that the device 210 does not need to migrate. In the case that the location of the device 210 is outside of the geographical boundaries of the first computing region 202 where the device 210 may be registered, the endpoint (e.g., a URL of an endpoint) provided to the device 210 may be for a second computing region 204 having geographical boundaries that include the location of the device 210. The endpoint provided to the device 210 may allow the device 210 to connect to the second computing region 204 and request that the device 210 be migrated to the second computing region 204.

In another example, in response to receiving a computing region discovery request from a device 210, a first computing region 202 may provide the device 210 with a listing of computing regions and computing region endpoints. The device 210 may be configured to identify a second computing region 204 in the listing to migrate to (e.g., based in part on the geographical boundaries for the second computing region 204 or instructions from a device user) and select an endpoint for the second computing region 204. The device 210 may use the endpoint to connect to the second computing region 204 and request migration to the second computing region 204.

In another example, a device migration service 212 included in a first computing region 202, with which a device 210 may be registered, may be configured to identify a location of the device 210 and determine that the device 210 is outside of a geographical region defined for the first computing region 202. For example, the device migration service 212 may periodically determine a location of a device 210 based on geographical coordinates provided by the device, or using another location detection technique. In determining that the device 210 may be outside of the computing region's geographical area, the device migration service 212 may instruct the device 210 to migrate to a second computing region 204 having a geographical region that includes the device's location. The device 210 may be provided with an identity token and an endpoint for the second computing region 204 that enables the device 210 to migrate to the second computing region 204.

In addition to obtaining an endpoint for a second computing region 204, as described above, the device 210 may request an identity token that allows the device 210 to migrate to the second computing region 204. In the example illustrated in FIG. 2A, a device 210 may be registered with a first computing region 202, wherein a device registry (shown in FIG. 3) for the first computing region 202 contains a registration record for the device 210. The registration record for the device 210 may include, but is not limited to: a device identifier, device security credentials, and a device policy. The registration record may allow the device 210 to connect to the first computing region 202, via a network, and access computing resources in the first computing region 202 specified in the device policy included in the registration record. Migrating a device 210 to a second computing region 202 may involve creating a new registration record for the device 210 in a second computing region device registry and updating a first computing region device registry to remove an existing registration record for the device 210.

In response to receiving a migration request from a device 210 at a first computing region 202 where the device 210 is registered, the device migration service 212 may determine whether the device 210 is authorized to migrate from the first computing region 202 to a second computing region 204. The device migration service 212 may obtain a device policy for the device 210 that defines whether the device 210 is allowed to migrate to a second computing region 204. In one example, the device policy may specify one or more computing regions that the device is allowed to migrate to. As an example, a device manufacturer may register a device 210 with a first computing region 202 as part of the manufacturing process, and the device manufacturer may specify in a device policy for the device 210 that the device 210 may be allowed to migrate to a second computing region 204 associated with a shipping destination of the device 210.

In determining that a device policy for a device 210 includes permissions for the device 210 to migrate to a second computing region 204, the device migration service 212 may generate an identity token. The identity token may indicate to a second computing region 204 that a device 210 associated with the identity token has been granted permission to migrate to the second computing region 204. In one example, the identity token may be generated to include a device identifier for the device 210. The device identifier may be used by the second computing region 204 to request a device record from the first computing region 202 as described below. In another example, the identity token may be generated to include device information obtained from a registration record included in a device registry managed in the first computing region 202. The device information included in the identity token can be used by a second computing region 204 to construct a new registration record in the second computing region's device registry. For example, a device identifier, device security credentials, and a device policy may be obtained from a registration record for the device 210 and the device identifier, device security credentials, and device policy may be included in the identity token.

In one example, an identity token may be signed using an encryption key provided by a key management service 206. Similar to what was described in association with FIGS. 1A-B, the key management service 206 may provision an encryption key to be sent to computing regions provided by a computing service provider, and the computing regions may use the encryption key to sign identity tokens and authenticate the identity tokens. For example, after generating an identity token that includes device information used to register a device 210 with a second computing region 204, the device migration service 212 may sign the identity token using an encryption key provided by the key management service 206.

An identity token may be provided to a device 210. After receiving the identity token from the first computing region 202, the device 210 (as illustrated in FIG. 2B) may send the identity token and a migration request to an endpoint for a second computing region 204. The second computing region 204 may receive the migration request from the device 210 and authenticate the identity token included with the migration request. As illustrated, the second computing region 204 may include a token authentication and authorization service 214 that authenticates the identity token using an encryption key provided by the key management service 206. As described earlier, the key management service 206 may provide the encryption key to both the first computing region 202 and the second computing region 204. Accordingly, the token authentication and authorization service 214 may use the encryption key provided by the key management service 206 to authenticate the identity token.

After successfully authenticating an identity token included with a migration request, a device 210 associated with the migration request may be registered with a second computing region 204. In one example, a device identifier included in the identity token may be used by the second computing region 204 to request a device record for the device from the first computing region 202. In response to receiving the request for the device record, the device migration service 212 in the first computing region 202 may send the device record to the second computing region 204. Thereafter, the device migration service 212 may remove a registration record for the device 210 from the first computing region's device registry. In another example, device information included in an identity token, such as a device identifier, device security credentials, and a device policy, may be used to create a registration record in a device registry for the second computing region 204. After registering the device 210 with the second computing region 204, the device 210 may receive a confirmation that registration with the second computing region 204 was successful. Thereafter, the device 210 may direct region communication requests to the second computing region 204. The first computing region 202 may receive a confirmation that the registration of the device 210 has been successfully registered with the second computing region 204. In response, the first computing region 202 may remove a registration record for the device 210 from the first computing region's device registry.

Figure 3A:
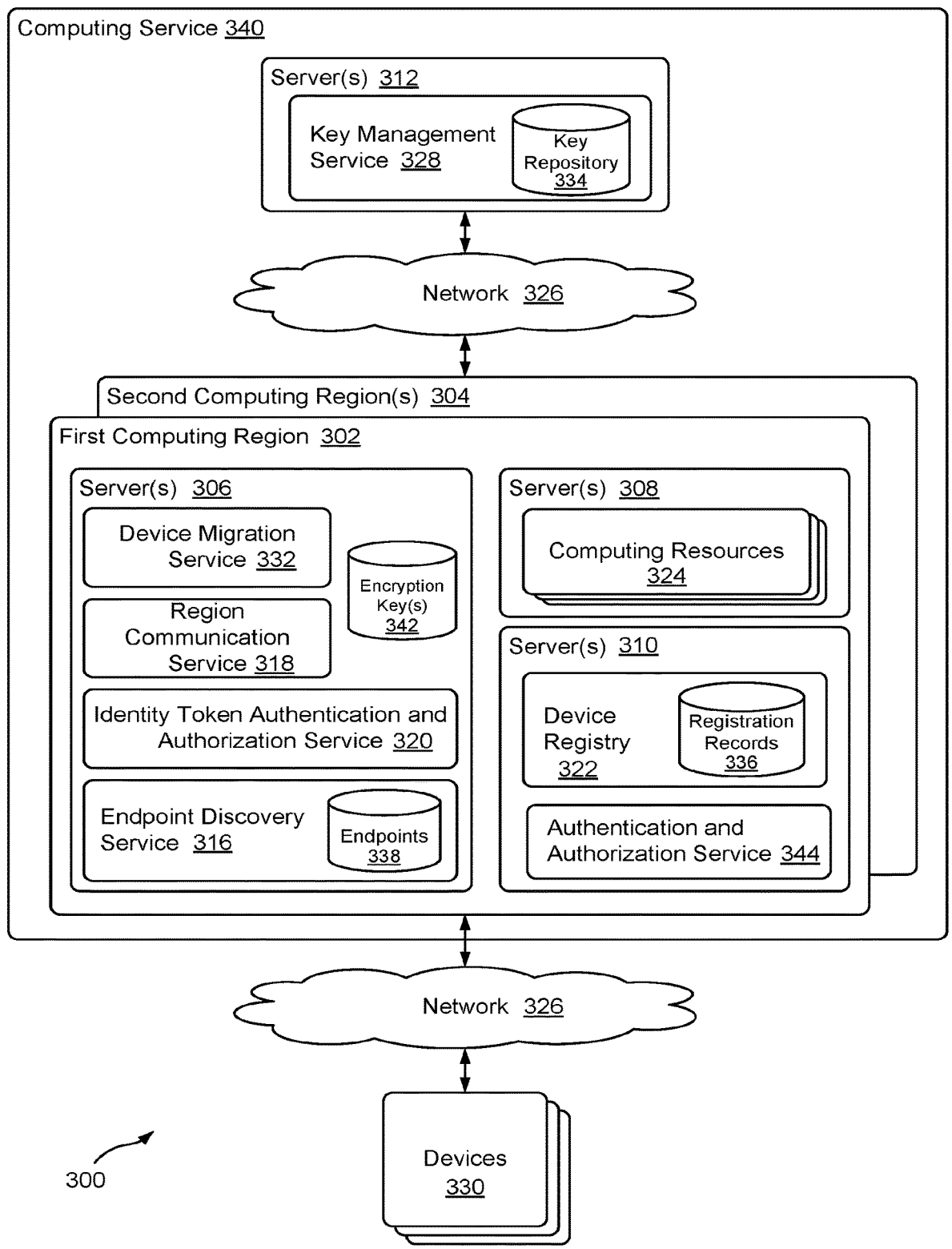
FIG. 3A is a block diagram that illustrates various example components included in a system for device communication with multiple computing regions.
Figure 3B:
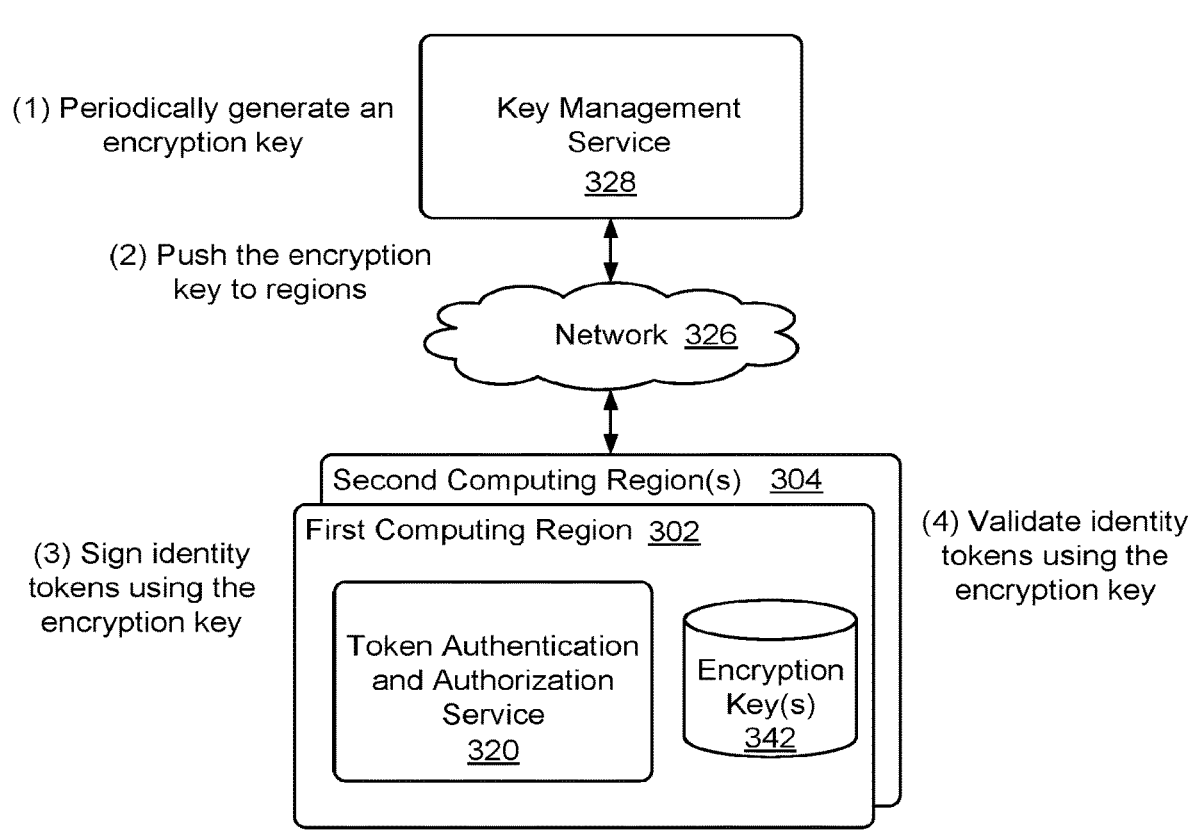
FIG. 3B is a diagram illustrating an example method for provisioning encryption keys to computing regions.

FIG. 3A illustrates components of an example system environment 300 on which the present technology may be executed. The system environment 300 may include centralized servers 312 and regionalized servers 306/308/310 that host managed services provided by a computing service provider using a computing service 340. In one example, regionalized servers 306/308/310 may host a device management service provided to devices 330 via a network 326. The device management service may be able to support billions of devices 330 and process and route trillions of messages to service endpoints for computing resources 324 and to the devices 330. The device management service may be replicated across data centers located in different geographical areas, thereby providing computing regions 302/304 to devices 330 located within the geographical areas. In another example, a data center may host multiple instances of the device management service on data center servers providing computing regions 302/304 to devices 330 assigned to the computing regions 302/304.

As illustrated, the servers 306 may host a region communication service 318, a device migration service 332, an identity token authentication and authorization service 320, and an endpoint discovery service 316. In one example, the region communication service 318 may be configured to provide an identity token to a device 330 that allows the device 330 to request a computing resource 324 from a second computing region 304 as part of a determination to send the device 330 to a second computing region 304 to obtain the computing resource 324. A decision to send a device 330 to a second computing region 304 may be based in part on a computing resource 324 being unavailable at a first computing region 302, utilization of a load balancing technique, or a determination to migrate the device 330 to the second computing region 304, as described in greater detail in association with FIGS. 5B-D. In one example, a decision to provide an identity token and instructions to the device 330 to connect to a second computing region 304 may be made by the region communication service 318. In another example, a decision to provide an identity token and instructions to connect to a second computing region 304 may be made by a gateway (shown in FIG. 8) for the first computing region 302.

In another example, the region communication service 318 may be configured to evaluate a region communication request received at an endpoint to a computing region 302/304 from a device 330 and grant or deny the region communication request based in part on permissions that allow the device 330 to communicate with various other computing regions 302/304. A region communication request received from a device 330 may include a device identifier, a computing region identifier for a computing region 302/304 for which the device 330 is requesting to communicate with, and information for an operation that the device 330 wants performed in the computing region 302/304. For example, the region communication request may be received at a first communication region 302, and the region communication request may indicate that the device 330 wants to communicate with a second computing region 304. A device identifier included in a region communication request from a device 330 can be used to obtain a registration record 336 linked to the device identifier from a device registry 322. A registration record 336 may include a device policy that grants permissions to a device 330 to connect to specified computing regions 302/304 and defines specified operations (e.g., subscribe to, and/or publish to, a topic) that may be performed in the specified computing regions 302/304 by the device 330. Illustratively, a device policy may include operation permissions for connecting to a message broker for a second computing region 304 in order to publish a message to a topic, receive a message published to a topic, and/or subscribe to a topic. Also, a device policy may include operation permissions for accessing a device representation that represents a device 330 in a second computing region 304 in order to retrieve the device representation, update the device representation, and/or delete the device representation. The region communication service 318 may be configured to determine whether a device policy included in a registration record 336 includes permissions that allow a device 330 to communicate with a computing region 302/304 specified in a region communication request.

In determining that a device policy for a device 330 grants the device 330 rights to communicate with a second computing region 304 identified in a region communication request, and grants an operation specified in the region communication request to be performed in the second computing region 304, the region communication service 318 may be configured to generate an identity token and provide the identity token to a device 330 associated with a respective region communication request. An identity token may indicate to a second computing region 304 that a device 330 is authorized to communicate with the second computing region 304 and request specified operations (e.g., publish to, subscribe to, a topic, or access a device representation). In one example, an identity token may include device credentials that can be used by a second computing region 304 to authenticate a device 330 and permissions for accessing computing resources 324 (e.g., a message broker service, device representations, data stores, etc.) in the second computing region 304. Illustratively, an identity token may include, but is not limited to: a URL token (e.g., a data token included in a URL), an object token (e.g., a JWT (JavaScript Object Notation Web Token), or other types of tokens. Illustratively, object tokens may be signed using a secret (e.g., a HMAC method) or a public/private key pair using the RSA (Rivest-Shamir-Adleman) cryptosystem.

In one example, the region communication service 318 may be configured to digitally sign an identity token using an encryption key provided by a key management service 328. In another example, the content of an identity token (e.g., the payload) may be encrypted using an encryption key provided by a key management service 328. The server 312 may host the key management service 328. The key management service 328 may be centrally managed and may be configured to generate encryption keys 342 (cryptographic keys), which may be stored using a key repository 334. The encryption keys 342 may be symmetric or asymmetric. In one example, as illustrated in the method shown in FIG. 3B, the key management service 328 may be configured to generate an encryption key and provision the encryption key 342 to computing regions 302/304, and the computing regions 302/304 may use the encryption key 342 to sign identity tokens and authenticate the identity tokens. The key management service 328 may be configured to periodically (e.g., every few minutes, several times a day, once a day, etc.) generate an encryption key and push the encryption key to the computing regions 302/304 using a push messaging system, thereby synchronizing the encryption key among the computing regions 302/304.

Returning to another example in FIG. 3A, services included in computing regions 302/304 (e.g., the computing the region communication service 318 and/or the device migration service 332) may retrieve an encryption key from the key repository 334 for the purpose of signing and authenticating identity tokens. For example, the region communication service 318 and/or the device migration service 332 may be configured to retrieve an encryption key from the key repository 334 in response to receiving an identity token request at a first computing region 302. The encryption key retrieved from the key repository 334 may be used to sign an identity token provided to a device 330, which then provides the identity token to a second computing region 304. In response to receiving the identity token at the second computing region 304, the identity token authentication and authorization service 320 located at the second computing region 304 may retrieve the encryption key from the key repository 334 and authenticate the identity token using the encryption key retrieved from the key repository 334.

Figure 5A:
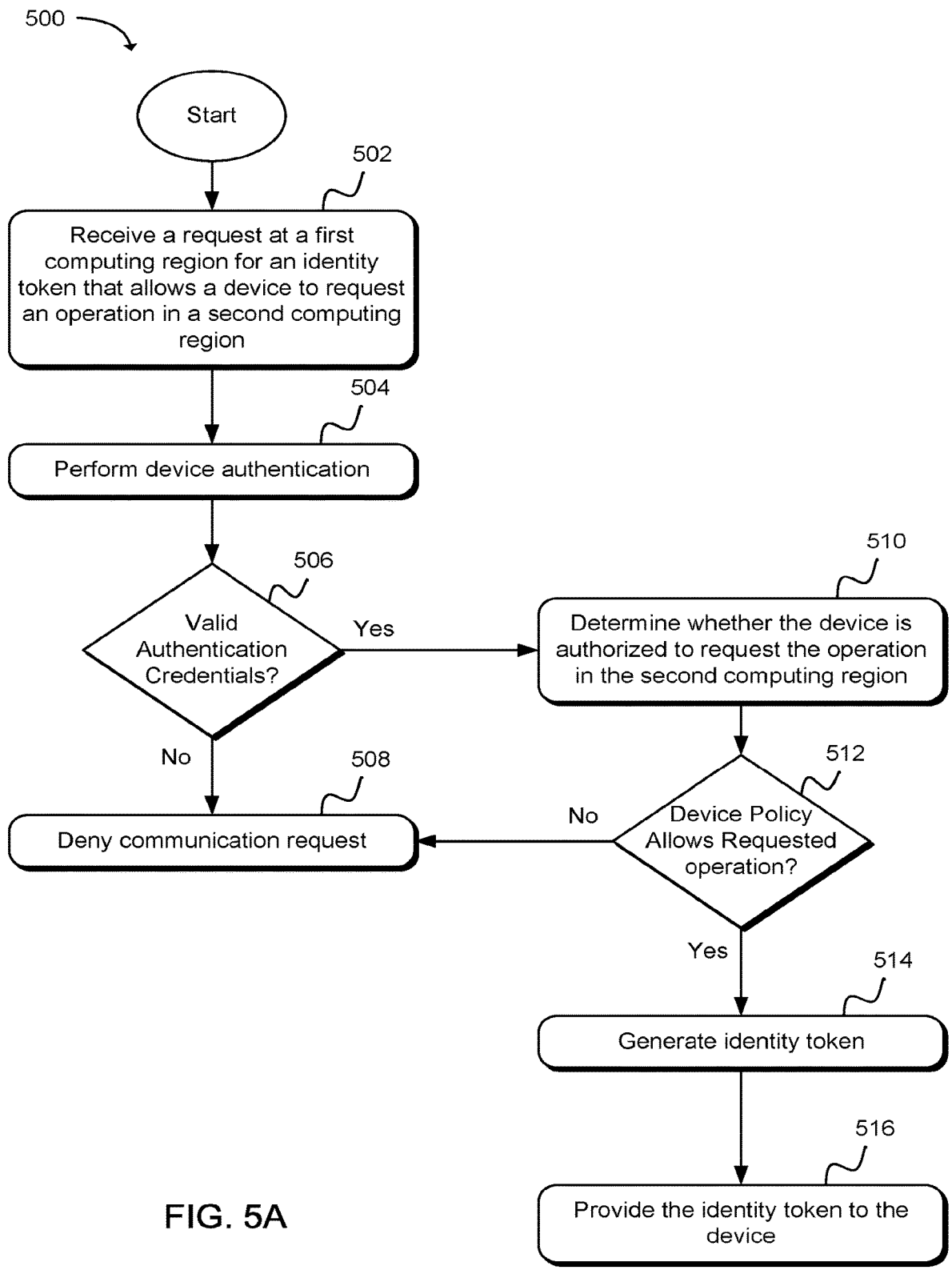
FIGS. 5A-D are flow diagrams that illustrate example methods for providing a device with an identity token that allows the device to request an operation in a second computing region.
Figure 5B:
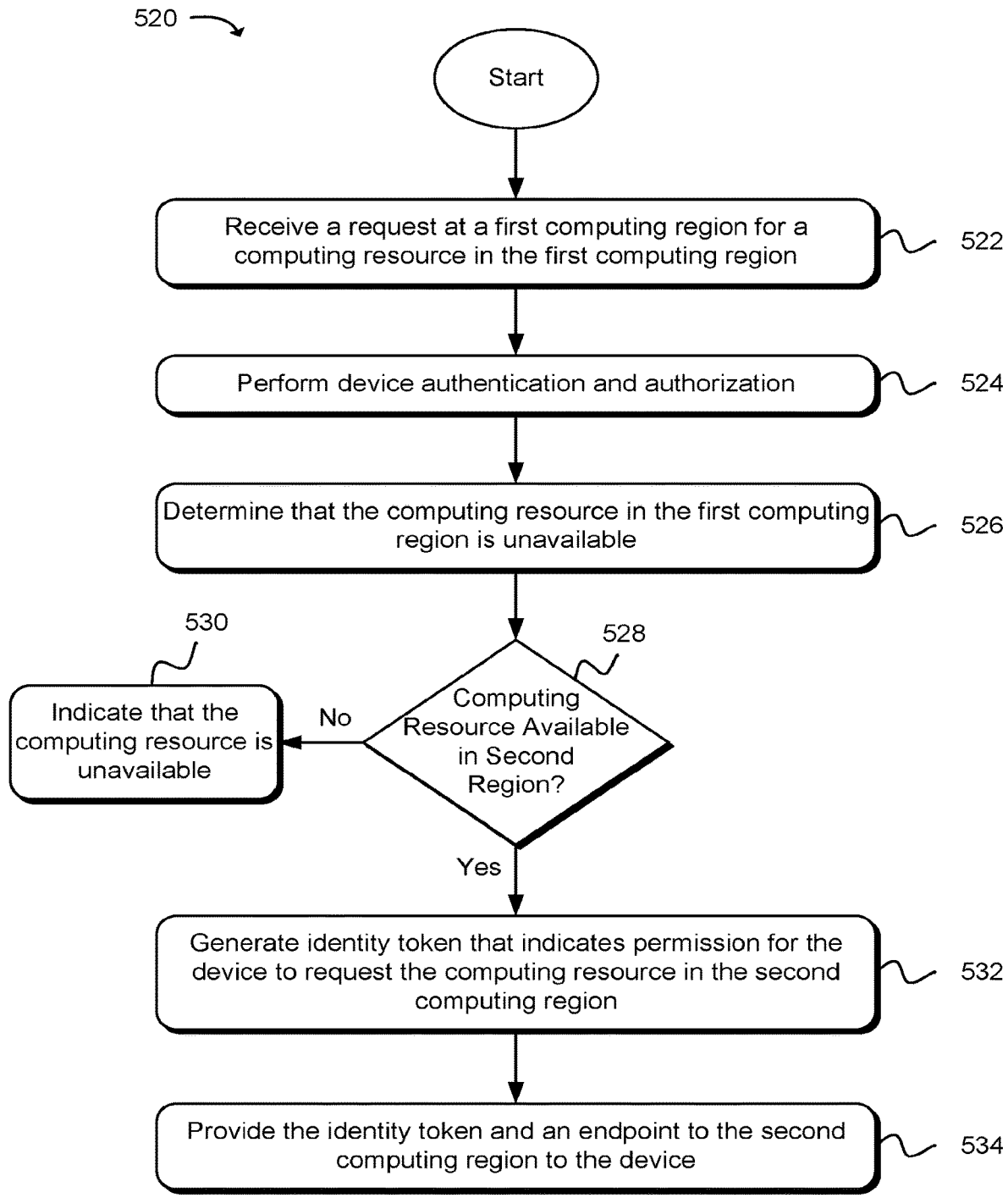
Figure 5C:
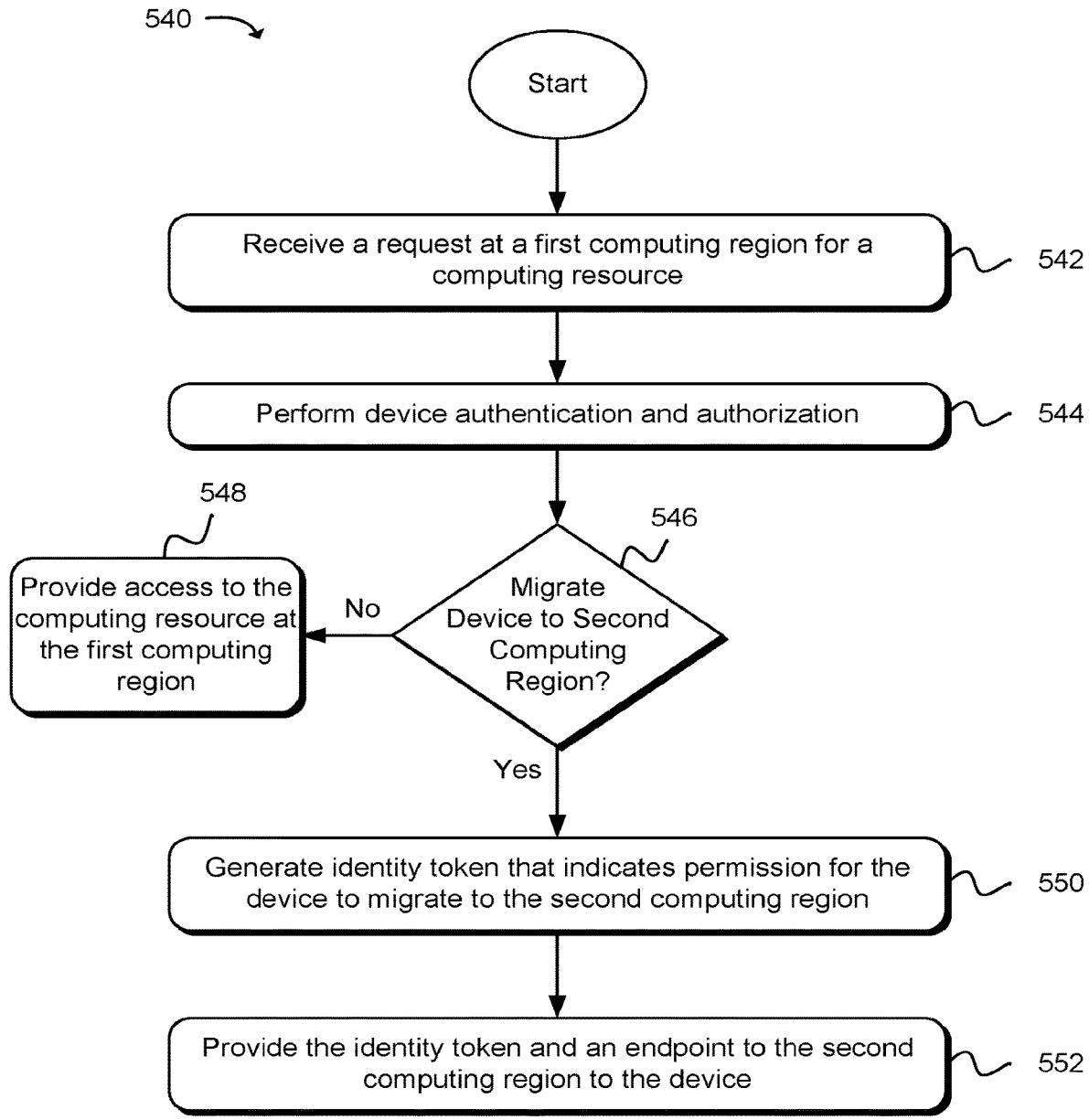

The device migration service 332, in one example, may be configured to determine whether to migrate a device 330 from a first computing region 302 to a second computing region 304 using transfer criteria (e.g., migration criteria), as described in greater detail in association with FIG. 5C. In another example, the device migration service 332 may be configured to evaluate a migration request received at an endpoint for a computing region 302/304 from a device 330 and grant or deny the migration request based in part on permissions that allow the device 330 to migrate from a computing region where the device 330 is registered (e.g., a first computing region 302) to another computing region 302/304 (e.g., a second computing region 304) specified in the migration request. A migration request received from a device 330 at a computing region where the device 330 is registered may include a device identifier and a computing region identifier for a computing region 302/304 to which the device 330 wants to migrate. A device identifier included in a migration request may be used to obtain a registration record 336 linked to the device identifier from a device registry 322. A registration record 336 may include a device policy that grants permissions to a device 330 to migrate to a computing region 302/304. Alternatively, permissions allowing a device 330 to migrate to a computing region 302/304 may be stored with an authentication and identity management service (not shown) and the permissions may be retrieved using a registration record. In one example, the device policy may specify which computing regions 302/304 a device 330 may migrate to. The device migration service 332 may be configured to determine whether the device policy allows a device 330 to migrate to a computing region 302/304 indicated in a migration request, and grant or deny the migration request accordingly.

In determining that a device policy for a device 330 grants a device 330 permission to migrate to a computing region 302/304, the device migration service 332 may be configured to generate an identity token and provide the migration token to a device 330 associated with the migration request. An identity token may indicate to a second computing region 304 that a device 330 is authorized to migrate to the second computing region 304. An identity token may include device information obtained from a registration record 336 included in the device registry 322. Illustratively, the device information may include, but is not limited to: a device identifier, device security credentials, and a device policy. The device information included in the identity token can be used to construct a new registration record 336 in the device registry 322 of a computing region 302/304, to which the device 330 is migrating to. In one example, the device migration service 332 may be configured to digitally sign an identity token using an encryption key provided by the key management service 328. In another example, the content of an identity token (e.g., the payload) may be encrypted using an encryption key provided by a key management service 328. Illustratively, an identity token may include, but is not limited to: a URL token (e.g., a data token included in a URL), an object token (e.g., a JWT (JavaScript Object Notation Web Token), or other types of tokens.

The device migration service 332 may be configured to register a device 330 migrating to a second computing region 304 using device information included in an identity token provided by a device 330 requesting to migrate to the second computing region 304. The device migration service 332 may be configured to extract device information (e.g., a device identifier, device security credentials, and a device policy) from the identity token and create a registration record 336 in a device registry 322 for the second computing region 304 using the device information. The registration record 336 may effectively migrate the device 330 to the second computing region 304. After creating the registration record 336 for the device 330, the device migration service 332 may be configured to send a deregistration message to a first computing region 302 which issued the identity token instructing the first computing region 302 to deregister the device 330 from the second computing region 304 (e.g., delete a registration record 336 for the device from a device registry 322 at the first computing region 302).

The identity token authentication and authorization service 320 may be configured to authenticate an identity token provided by a device 330 requesting to connect to a computing region 302/304. The identity token authentication and authorization service 320 may authenticate an identity token using an encryption key provided by the key management service 328. For example, a first computing region 302 may sign an identity token using an encryption key provided by the key management service 328, and a second computing region 304 may authenticate the identity token using a copy of the encryption key provided to the second computing region 304 by the key management service 328. After authenticating the identity token, the identity token authentication and authorization service 320 may be configured to determine whether permissions included in the identity token allow the device 330 to request an operation (e.g., access a computing resource 324 or migrate to a computing region 302/304) specified in the request to connect to the computing region 302/304.

The endpoint discovery service 316 may be configured to provide an endpoint 338 (e.g., a URL of an endpoint) for a computing region 302/304 to a device 330 in response to an endpoint discovery request received from the device 330. An endpoint 338 for a computing region 302/304 (e.g., a URL) may allow a device 330 to send a request and identity token to a gateway (shown in FIG. 8) for the computing region 302/304. An endpoint discovery request may include, but is not limited to: a parameter specifying a computing region 302/304 (e.g., a computing region identifier) for which an endpoint is requested, a parameter specifying a geolocation (e.g., location coordinates, location name, etc.) of a device 330 used to identify an endpoint for a computing region 302/304 assigned to the geolocation, or a parameter requesting a listing of endpoints for computing regions 302/304 that may be available to a device 330. As part of receiving an endpoint discovery request from a device 330, the endpoint discovery service 316 may be configured to determine whether a device policy included in a registration record 336 for the device 330 permits the device 330 to request an endpoint for a computing region 302/304. The endpoint discovery service 316 may manage endpoint data (e.g., an endpoint table) containing last known endpoints for computing regions 302/304 by periodically updating the endpoint data. Alternatively, the endpoint discovery service 316 may obtain endpoints for computing regions 302/304 from a centrally managed endpoint data store.

A computing region 302/304 may include an authentication and authorization service 344 which may be configured to authenticate a device 330 associated with a request to connect to a computing resource 324, application, or another device. The authentication and authorization service 344 may be configured to support various methods of authentication, including signature, certificate, token, username-password, and other authentication methods. A method of authentication used may be based on a connection protocol used by a device 330. For example, devices 330 that connect to a computing region 302/304 using HTTP (Hypertext Transport Protocol) can use signature or certificate authentication, while device connections using MQTT (MQ Telemetry Transport) may use certificate based authentication, and device connections using WebSockets may use signature authentication. Accordingly, the authentication and authorization service 344 may be configured to use an authentication method that uses a connection protocol used by a device 330.

The various processes and/or other functionality contained within the system environment 300 may be executed on one or more processors that are in communication with one or more memory modules. The system environment 300 may include a number of computing devices that are arranged, for example, in one or more server banks or computer banks or other arrangements. The computing devices may support a computing environment using hypervisors, virtual machine monitors (VMMs) and other virtualization software. The computing environment may include computing instances (e.g., virtual machines), which may be an instance of a software implementation of a machine (i.e. a computer) configured to emulate a physical machine, as described in greater detail in association with FIG. 9. The computing instances may host various components included in the device management service described above. For example, the servers 306/308/310/312 may be implemented using computing instances.

The system environment 300 may include data stores used to store endpoints 338 (e.g., a URL of an endpoint), registration records 336, encryption keys 342, etc. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), a virtualized and centralized data storage network (e.g., cloud storage), volatile or non-volatile RAM, optical media, or hard-drive type media. The data store may be representative of a plurality of data stores as can be appreciated.

The network 326 used to transmit communications between the components in the system environment 300 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing may be performed using services. In one example configuration, a service with one or more processes may execute on a server or other computer hardware. Such services may be centrally hosted functionality, and a service application may receive requests and provide output to other services or consumer devices. For example, services may be considered on-demand computing that are hosted in a server, virtualized service environment, grid or cluster computing system. An API may be provided for services to enable a second service to send requests to and receive output from the first service. Such APIs may also allow third parties to interface with the service and make requests and receive output from the services. The API calls, procedure calls, or other network commands that may be made in relation to the services may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services. While FIG. 3 illustrates an example of a system that may implement the techniques above, many other similar or different environments are possible. The example environments discussed and illustrated above are merely representative and not limiting.

Figure 4:
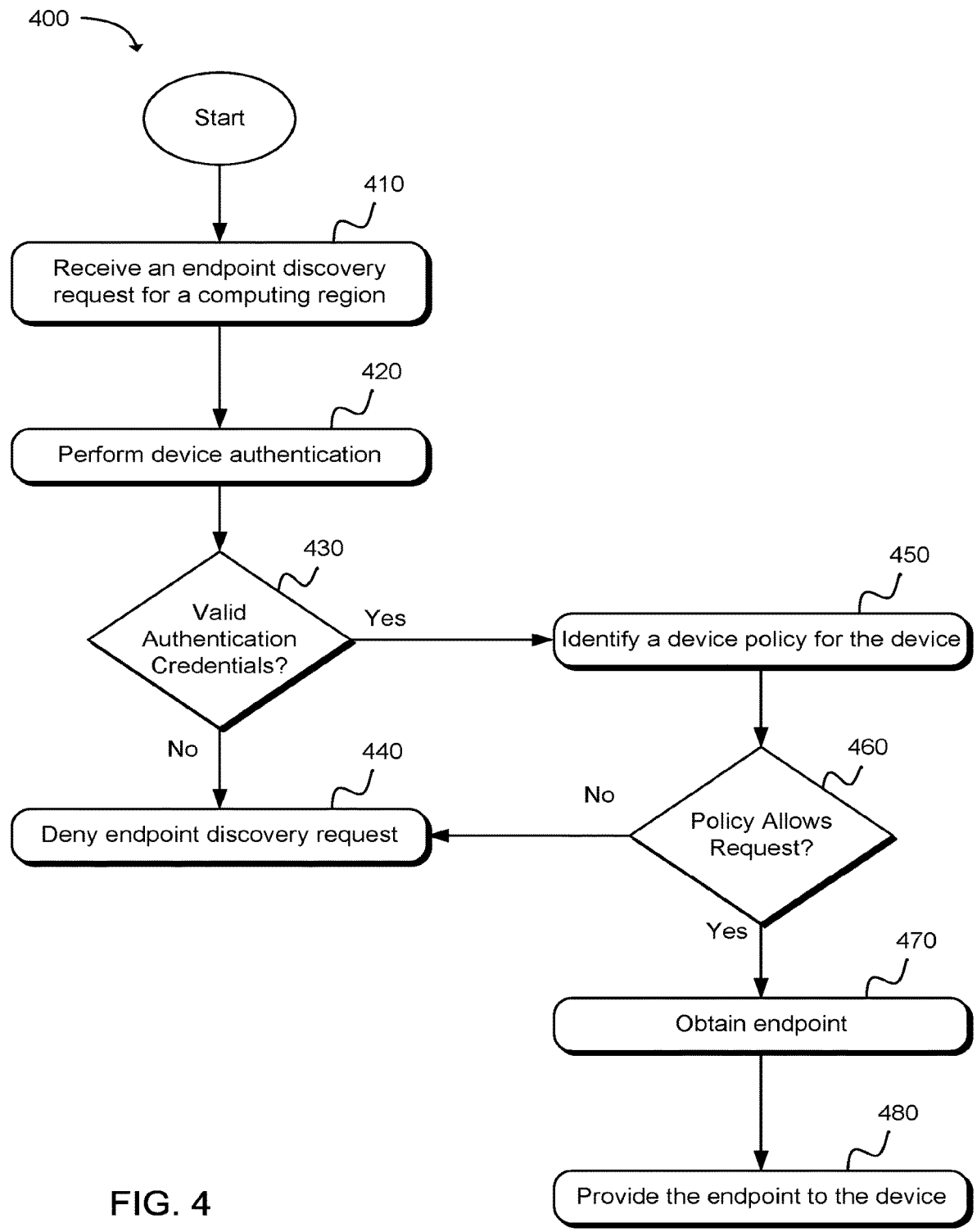
FIG. 4 is a flow diagram illustrating an example method for a discovery request for a computing region endpoint.

FIG. 4 is a flow diagram illustrating an example method 400 for a discovery request for a computing region endpoint. Devices located in defined geographical areas may use endpoints to connect to computing regions that provide a device management service to the devices. An endpoint may be a URL for an entry point to a computing region. Data centers hosting computing regions may be located in separate geographical regions and each computing region may have one or more endpoints used by devices to connect to the computing regions.

Devices configured to connect to more than one computing region may obtain an endpoint for a computing region by submitting an endpoint discovery request to a computing region with which the device is registered ("home computing region"). The computing regions may be managed by a service provider. In one example, computing regions may maintain an endpoint table (e.g., a database table). In another example, computing regions may obtain endpoints for other computing regions from a centrally managed endpoint table. An endpoint table may be updated to include changes to endpoints, and to indicate events (e.g., service outages) that may result in an endpoint being temporarily unreachable.

As in block 410, a device may send an endpoint discovery request to the device's home computing region. In one example, an endpoint discovery request may be for an endpoint (e.g., a URL of an endpoint) for a specific computing region. For example, a device may include a geolocation (e.g., location coordinates, location name, etc.) in an endpoint discovery request and the geolocation may be used to identify an endpoint for a computing region assigned to the geolocation. In another example, an endpoint discovery request may be for a listing of computing regions and associated endpoints. For example, a device may request a listing of endpoints for computing regions that may be accessible to the device based on a device policy.

In response to receiving the endpoint discovery request at the home computing region, as in block 420, device authentication may be performed for authentication credentials provided by the device in the endpoint discovery request. As in block 430, in the case that the authentication fails, then as in block 440, the endpoint discovery request may be denied. In the case that authentication is successful, then authorization of the endpoint discovery request may be performed.

Authorization for the endpoint discovery request may be performed at the home computing region, as in block 450, by identifying a device policy for the device and, as in block 460, determining whether the device policy allows the device to request endpoints for other computing regions. In one example, the device policy may include permissions that allow a device to request endpoints for other computing regions. In another example, the device policy may specify which computing regions the device is allowed to connect to. Thus, endpoints for those computing regions specified in the device policy may be provided to the device, whereas endpoints for computing regions not specified in the device policy may not be provided to the device.

In the case that the device policy includes permissions that allow the device to request an endpoint for a computing region specified in the endpoint discovery request, then as in block 470, the endpoint may be obtained (e.g., from an endpoint table) and, as in block 480, the endpoint may be provided to the device. Should the device policy not include permissions that allow the device to request the endpoint for a computing region, then the endpoint discovery request may be denied, as in block 440.

FIG. 5A is a flow diagram that illustrates an example method 500 for providing a device with an identity token that allows the device to request an operation in a second computing region. In one example, an operation requested by a device may include an operation that may be performed by a computing resource included in a second computing region, such as publishing to, and/or subscribing to, a topic. In another example, an operation requested by a device may include migrating the device from a first computing region to a second computing region. As in block 502, a request from a device may be received at a first computing region where the device may be registered. The request may be for an identity token an identity token and the request may include information for a second computing region (e.g., a computing region identifier) where the device wants the operation performed.

In response to receiving the request from the device, as in block 504, device authentication may be performed. The device may be authenticated using authentication credentials provided by the device in the request to the first computing region. For example, the device may be configured to store the authentication credentials on the device and provide the authentication credentials in requests made to the first computing region. As in block 506, in the case that device authentication fails, the request from the device may be denied (see block 508). However, in the case that device authentication is successful, then as in block 510, a determination whether the device is authorized to request the operation in the second computing region may be made.

Authorization for the operation in the second computing region may be determined by identifying a device policy for the device and, as in block 512, determining whether the device policy allows the device to request operations in the second computing region. The device policy may include permissions for connecting to a second computing region and requesting that an operation be performed in the second computing region on behalf of the device. As one example, the device policy may include operation permissions for connecting to a message broker for the second computing region for the purpose of: publishing a message to a topic, receiving a message published to the topic, or subscribing to the topic in the second computing region. As another example, the device policy may include operation permissions for accessing a device representation that represents the device in the second computing region for the purpose of: retrieving the device representation, updating the device representation, or deleting the device representation (e.g., shadow copy of a device). As yet another example, the device policy may include operation permissions for migrating from a first computing region to a second computing region.

In the case that the device policy includes permissions that allow the device to request the operation specified in the request to be performed in the second computing region, then as in block 514, an identity token that grants the device permission to request the operation in the second computing region may be generated. The identity token may be a temporary token that expires after a predetermined amount of time or allows a one-time communication session with the second computing region. The identity token may be signed using an encryption key provided to both the first computing region and the second computing region, and the identity token may be provided to the device, as in block 516. The signed identity token may indicate to the second computing region that the device is authorized to request the operation.

FIG. 5B is a flow diagram illustrating an example method 520 for providing a device with an identity token that allows the device to request a computing resource in a second computing region in the event that the computing resource in a first computing region requested by the device is unavailable. As an example, the computing resource in the first computing region may be down (e.g., due to maintenance or a service disruption), and therefore the computing resource may be unavailable to the device. As another example, the computing resource may not be implemented in the first computing region.

When a determination is made that a computing resource may not be available in a first computing region, a device may be provided with an identity token that allows the device to request the computing resource from another computing region that includes the computing resource. For example, as in block 522, a request for a computing resource may be received at a first computing region. Illustratively, the request may be received at a gateway configured to provide an interface between devices and the first computing region. The request may include a message requesting access to a computing resource (e.g., a message broker service, a device representation service, data storage services, computing services, networking services, and other services) in the first computing region. In response to receiving the request for the computing resource, as in block 524, device authentication and authorization may be performed. For example, authentication may be performed using device credentials associated with the device, and authorization may be performed by referencing a device policy associated with the device for permissions that allow the device access to the computing resource.

As in block 526, a determination may be made that the computing resource is unavailable in the first computing region. For example, the computing resource in the first computing region may be down, or the computing resource may not be implemented in the first computing region. In response, a determination whether the computing resource (e.g., an instance of the computing resource) is available in another computing region may be made, as in block 528.

In one example, additional factors may be used to identify a computing region that includes the computing resource. As one example, a geolocation of the device may be used to identify a computing region with the requested computing resource which is geographically closer to the device as compared to other computing regions that also have the computing resource. As another example, available computing region capacity to handle the request for the computing resource may be used to identify a computing region which has the computing resource. As another example, a determination may be made whether the device policy for the device includes permission for the device to communicate with computing regions with which the device is not registered. For example, the device policy may include a permission that allows the device to connect to a second computing region that includes the computing resource requested by the device.

In one example, a computing region that includes the computing resource may be identified by querying a second computing region to determine whether the second computing region includes the computing resource. In another example, a data store (e.g., database) of computing regions and computing resources may be queried to identify a second computing region that includes the computing resource. The data store may be a centralized data store (e.g., managed by a computing service provider), or alternatively, each computing region may have an instance of the data store. In the case where a computing region with the computing resource cannot be identified, then as in block 530, an indication (e.g., a message) that the computing resource is unavailable (e.g., unavailable at the first computing region and/or any other computing region) may be provided to the device.

In the case that a second computing region is identified as having the computing resource, and the computing resource is available to the device (e.g., a device policy allows the device access to the computing resource in the second computing region), then as in block 532, an identity token may be generated to indicate permission for the device to request the computing resource from the second computing region. For example, the identity token may indicate that the device is authorized to communicate with the second computing region and the identity token may include permissions for accessing the computing resource included in the second computing region.

In one example, the identity token may be signed by the first computing region using an encryption key (e.g., a private key), and the identity token may be authenticated by the second computing region using a copy of the encryption key. In another example, the identity token may be a temporary token that expires after a predetermined amount of time or allows a one-time communication session with the second computing region.

After generating the identity token, as in block 534, the identity token and an endpoint to the second computing region may be provided to the device. In one example, the device may be instructed to use the endpoint to connect to the second computing region and request the computing resource from the second computing region using the identity token. Accordingly, the device may use the endpoint to connect to the second computing region, whereupon the device provides the identity token to the second computing region. The second computing region (e.g., a gateway) may authenticate the identity token (e.g., using the encryption key used to sign the identity token) and allow the device to access the computing resource in the second computing region.

FIG. 5C is a flow diagram that illustrates an example method 540 for providing a device with an identity token that allows the device to migrate to a second computing region. More specifically, the identity token allows a device to register with a second computing region and allows device data for the device to be transferred from a first computing region (where the device is currently registered) to a second computing region based in part on transfer criteria for transferring the device data. As an illustration, a device may be mobile and the device may be moved from a first geographical location (e.g., Seattle) which may be assigned to a first computing region, to a second geographical location (e.g., Atlanta), which may be assigned to a second computing region. In moving the device to the second computing region, a device registration and device data for the device may be transferred from the first computing region to the second computing region.

For example, as in block 542, a request may be received at a first computing region for a computing resource. In response to receiving the request, as in block 544, device authentication and authorization may be performed as described earlier. As in block 546, a decision whether to migrate the device to a second computing region may be made. In one example, a determination whether to migrate a device may be based in part on transfer criteria for transferring device data to another computing region. Illustratively, the transfer criteria may include, but is not limited to: permission to transfer the device data, a geolocation of the device being associated with the second computing region, service limits associated with the device (e.g., a service limit on a number of MQTT connect requests per second, a number of inbound/outbound publish requests per second, a number of subscriptions per second/session, etc.), a latency associated with transferring the device data to the second computing region, and/or costs (e.g., performance costs, downtime costs, monetary costs, as well as other costs) associated with transferring the device data to the second computing region.

In one example, deciding whether to migrate a device to a second computing region may include determining whether a device may be authorized to migrate to the second computing region. For example, a device policy may be referenced to determine whether the device policy includes a permission that allows the device to migrate to other computing regions. After determining that a device is authorized to migrate to a second computing region, additional migration criteria may be evaluated. For example, a geolocation of a device may be used as one criterion in determining whether to migrate the device to a second computing region. For example, a geolocation of a device registered with a first computing region may indicate that the device is located within a geographical boundary assigned to a second computing region, and a determination may be made to migrate the device to the second computing region. In one example, a geolocation for a device may be obtained from a device. For example, a device may include a location sensor (e.g., a GPS sensor) and the device may provide a geolocation obtained from the location sensor to a first computing region where the device may be registered. In another example, a geolocation of a device may be determined using an IP (Internet Protocol) address assigned to the device.

A latency associated with transferring device data associated with a device to a second computing region may be used as one criterion in determining whether to migrate a device to the second computing region. For example, where latency associated with transferring the device data to the second computing region may be high, a determination not to migrate the device to the second computing region may be made based in part on the latency. As an example, benefit analysis performed may indicate that high latency associated with transferring the device data to the second computing region outweighs other benefits (e.g., reduced network delay) associated with migrating the device to the second computing region. However, where the latency associated with transferring the device data to the second computing region may be low, a determination to migrate the device to the second computing region may be made based in part on the latency. Also costs associated with transferring device data to a second computing region may also be used as criteria to determine whether to migrate a device to the second computing region. For example, performance costs, downtime costs, monetary costs, as well as other costs associated with transferring the device data to the second computing region may be evaluated. If the costs are too high, a determination not to migrate the device to the second computing region may be made.

In the case that a decision is made not to migrate the device to the second computing region, then as in block 548, the computing resource request may be performed. In the case that a decision is made to migrate the device to the second computing region, then as in block 550, an identity token indicating permission for the device to migrate to the second computing region may be generated. The identity token may include registration information for the device that can be used to create a registration record for the device with the second computing region or transfer a registration record from the first computing region to the second computing region. In one example, the identity token may be signed by the first computing region using an encryption key provided by a key management service.

After generating the identity token, as in block 552, the identity token and an endpoint to the second computing region may be provided to the device. The device may use the endpoint to connect to the second computing region and provide the identity token to the second computing region. The identity token may be authenticated at the second computing region (e.g., using an encryption key used to sign the identity token). Thereafter, in one example, a transfer request may be sent to the first computing region requesting that device data associated with the device be transferred to the second computing region. In response to the transfer request, the first computing region may send the device data associated with the device to the second computing region. The device data may be used to register the device in the second computing region and the device data may be utilized by the computing resource in the second computing region. In one example, after registering the device in the second computing region, a deregistration message may be sent to the first computing region indicating that the device is registered at the second computing region. The first computing region may then remove the registration record for the device from a device registry at the first computing region.

Figure 5D:
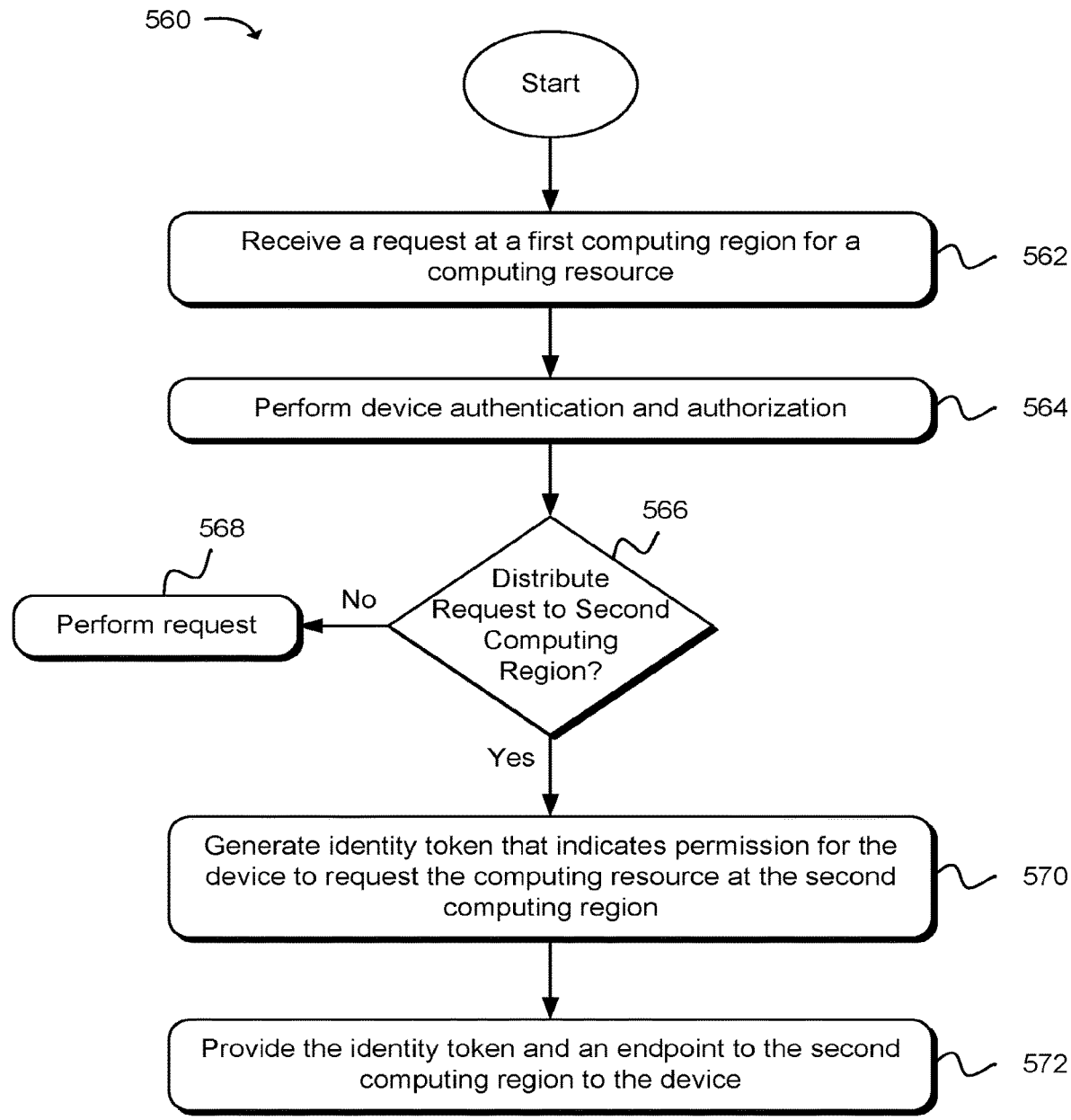

FIG. 5D is a flow diagram that illustrates an example method 560 for providing a device with an identity token that allows the device to request a computing resource in a second computing region as part of distributing computing resource requests between a first computing region and the second computing region. For example, load balancing may be used to distribute computing resource requests received from devices between computing regions, thereby distributing computing resource workloads among multiple computing regions. As in block 562, a request may be received at a first computing region for a computing resource. In response to receiving the request, as in block 564, device authentication and authorization may be performed as described earlier. As in block 566, a determination whether to distribute the computing resource request to a second computing region may be determined. Illustratively, a determination to distribute a computing resource request to a second computing region may be based in part on a volume of network traffic at the first computing region, a workload of a computing resource at the first computing region, a performance degradation of a computing resource at the first computing region, as well as other factors.

In one example, a determination to distribute a computing resource request to a second computing region may be based in part on negotiations between a first computing region and a second computing region. Illustratively, negotiations may be based in part on network traffic at the computing regions, workloads at the computing regions, a number of devices connected to the computing regions, as well as other factors. For example, a determination that a workload of a computing resource at a first computing region may be greater than a workload of the computing resource at a second computing region may result in sending a device to the second computing region. In one example, internal communication channels may be used to distribute information used for negotiating load balancing. For example, messages that include region load information, such as workloads, network traffic, and/or device connection information, may be exchanged between computing regions. The messages may be published to a load balancing topic and regions may subscribe to the load balancing topic, or the messages may be streamed using a message streaming service. In another example, a centralized data store may be used to exchange region load information between computing regions. The centralized data store may be queried by load balancing agents to obtain load balancing information for a computing region and the region load information may be used by the load balancing agents to negotiate load balancing between computing regions.

In the case that a determination is made not to distribute the computing resource request to the second computing region, then as in block 568, the computing resource request may be performed at the first computing region. In the case that a determination is made to distribute the computing resource request to the second computing region, then as in block 570, an identity token indicating permission for the device to request the computing resource at the second computing region may be generated. The identity token may indicate permission for the device to request the computing resource from the second computing region. For example, the identity token may indicate that the device is authorized to communicate with the second computing region and the identity token may include permissions for accessing the computing resource included in the second computing region.

In one example, the identity token may include an instruction for the second computing region to maintain a communication session for the device for a specified amount of time. The communication session may be maintained for a time to complete a task or transaction in the second computing region. In another example, temporary security credentials may be created for the device. The temporary security credentials may be valid for a specified duration (e.g., from 15 minutes up to a maximum of 36 hours. A device customer may specify the amount of time that temporary security credentials are valid. In one example, the identity token may be signed by the first computing region using an encryption key provided by a key management service.

After generating the identity token, as in block 572, the identity token and an endpoint to the second computing region may be provided to the device with an instruction for the device to connect to the second computing region using the endpoint and request the computing resource from the second computing region using the identity token. Accordingly, the device may use the endpoint to connect to the second computing region and provide the identity token to the second computing region. In one example, the second computing region (e.g., a gateway) may authenticate the identity token using the encryption key used to sign the identity token and allow the device to access the computing resource in the second computing region.

Figure 6:
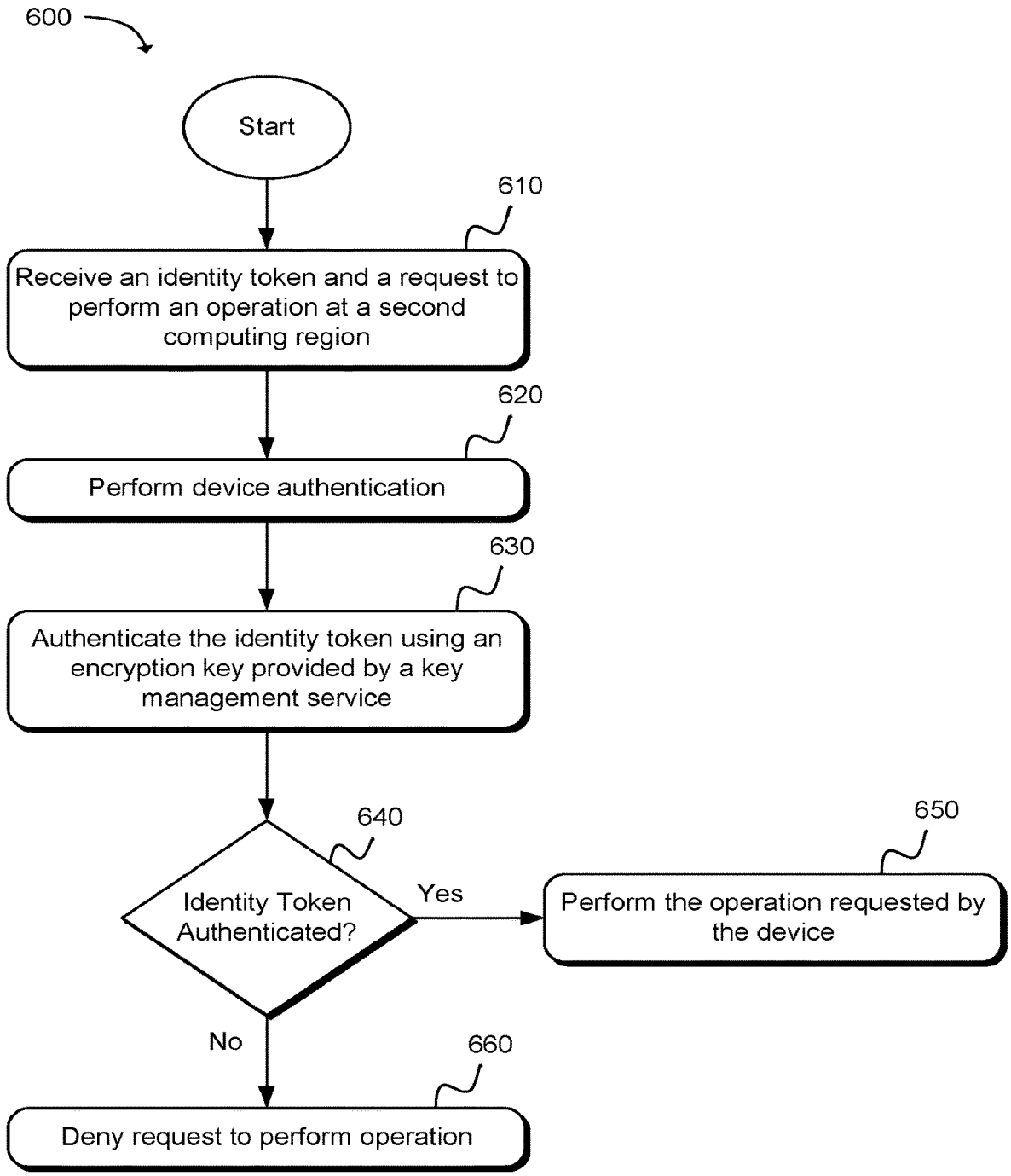
FIG. 6 is a flow diagram that illustrates an example method for performing an operation in a second computing region in response to receiving an identity token that authorizes a device to request performance of the operation in the second computing region.

FIG. 6 is a flow diagram illustrating an example method 600 for performing an operation in a second computing region in response to receiving an identity token that authorizes a device to request performance of the operation in the second computing region. As in block 610, an identity token and a request to perform an operation in a second computing region may be received at the second computing region. The request may be from a device that obtained the identity token from a first computing region where the device may be registered. The device may not be registered with the second computing region and therefore may not have privileges with the second computing region to connect to the second computing region and request operations. Thus, the device may obtain an identity token from the first computing region that allows the device to connect to the second computing region and request an operation specified in the identity token, such as accessing a computing resource in the second computing region, or migrating to the second computing region.

As in block 620, device authentication may be performed using TLS client authentication, and as in block 630, the identity token included in the request from the device may be authenticated using an encryption key provided by a key management service to both the first computing region and the second computing region. The identity token may have been signed using the encryption key at the first computing region and the identity token may be authenticated at the second computing region using a copy of the encryption key.

The identity token may indicate that the device is authorized to request the operation specified in the request, therefore, as in block 640, in the case that the identity token is authenticated then, as in block 650, the operation requested by the device may be performed. As an illustration where the operation requested by the device is to access a computing resource in the second computing region, such as publish/subscribe to a topic, or update a device representation for the device, then the operation may be performed in the second computing region. As another illustration where the operation requested by the device is to migrate from the first computing region to the second computing region, a registration record may be created in the second computing region using device information included in the identity token, and a message may be sent to the first computing region instructing the first computing region to deregister the device from the first computing region. In the case that authentication of the identity token fails, then as in block 660, the request to perform the operation may be denied.

Figure 7:
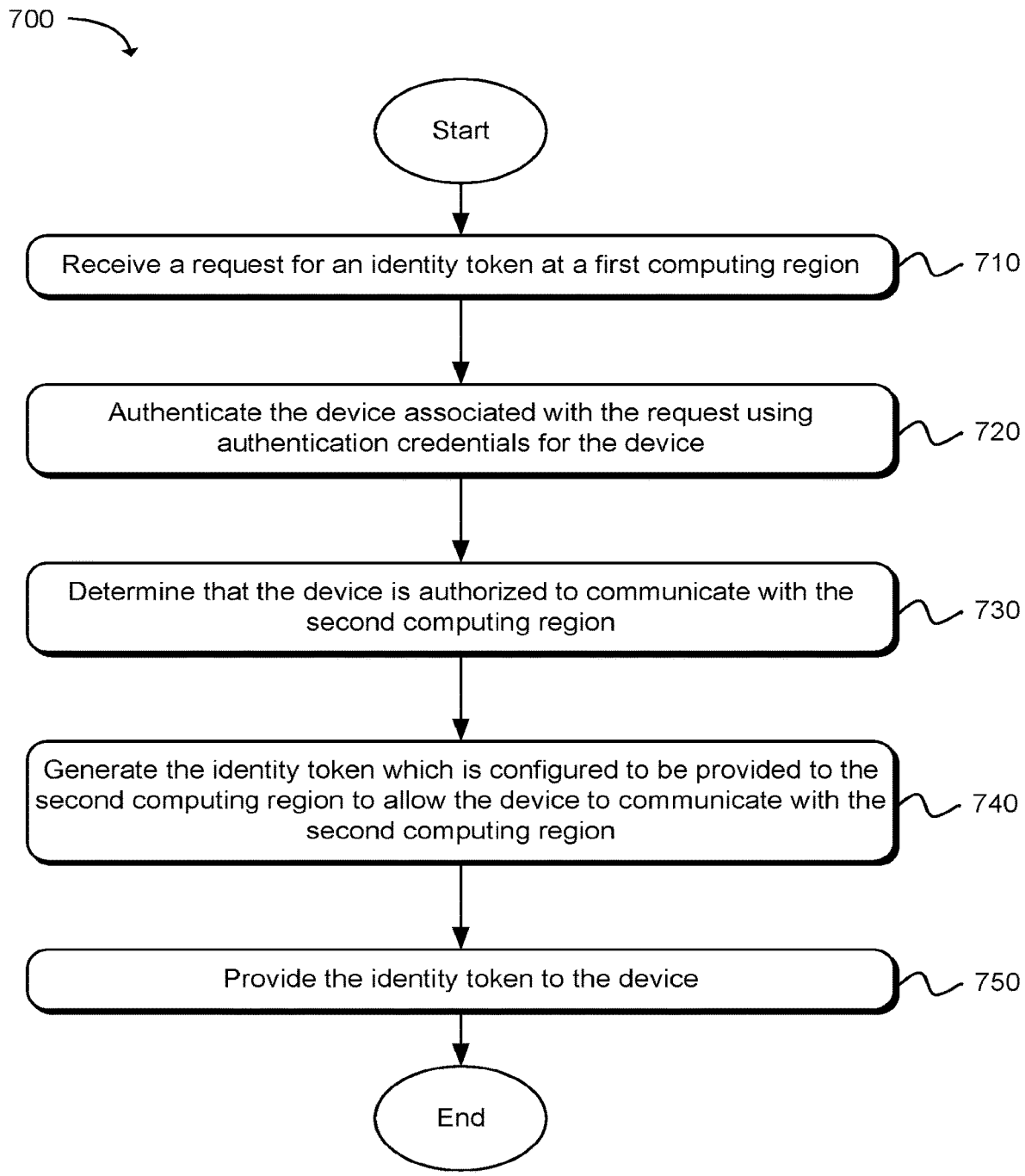
FIG. 7 is a flow diagram that illustrates an example method for device communication between computing regions.

FIG. 7 is a flow diagram illustrating an example method 700 for device communication with computing regions. As in block 710, a request for an identity token may be received at a first computing region, where the identity token enables a device to communicate with a second computing region. The request for the identity token may include a request to perform an operation in the second computing region. In one example, the operation may include accessing a computing resource provided by the second computing region. In another example, the operation may include migrating the device from the first computing region to the second computing region.

As in block 720, the device associated with the request may be authenticated using authentication credentials for the device. After authenticating the device, as in block 730, a determination that the device is authorized to communicate with the second computing region may be made. In one example, a device policy for the device stored in the first computing region may be identified and a determination may be made that the device policy includes a permission that allows the device to communicate with the second computing region to request an operation in the second computing region.

As in block 740, the identity token may be generated to be provided to the second computing region to allow the device to communicate with the second computing region. The identity token may be generated to include permissions for communicating with the second computing region and requesting performance of an operation in the second computing region. The identity token may be a temporary token that expires after a predetermined amount of time, or the identity token may allow a one-time communication session with the second computing region. In one example, the identity token may be signed using an encryption key generated by a key management service, wherein the encryption key may be provided to both the first computing region and the second computing region. The key management service may periodically generate the encryption key and push the encryption key to the first computing region and the second computing region. Alternatively, the encryption key may be retrieved from a key repository that is accessible via a network to both the first computing region and the second computing region.

As in block 750, the identity token may be provided to the device, wherein the device is configured to present the identity token to the second computing region, allowing the device to communicate with the second computing region. In one example, the device may communicate with the second computing region and request access to a computing resource in the second computing region. In another example, the device may communicate with the second computing region and request a migration operation that registers the device with the second computing region and deregisters the device with the first computing region.

Figure 8:
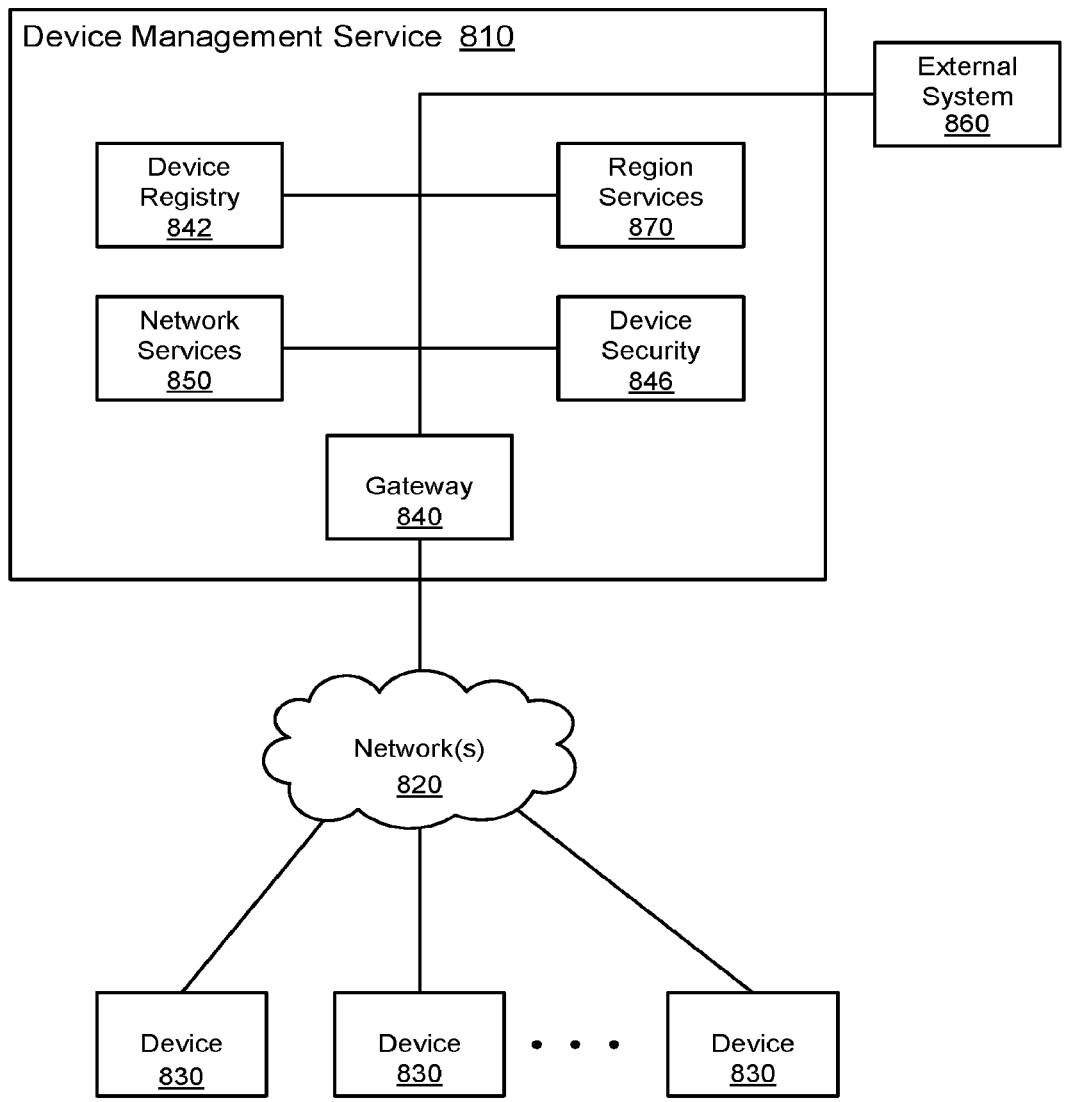
FIG. 8 is a block diagram illustrating an example computer networking architecture for providing device access to network services.

FIG. 8 is a block diagram illustrating additional components that may be included in an example device management service 810 with which the devices 830 described earlier may communicate and use the operations provided by the device management service 810. The device management service 810, which may also be referred to as a device communication environment may comprise various resources made accessible via a gateway server 840 to the devices 830 that access the gateway server 840 via a network 820. The devices 830 may access the device management service 810 in order to access services such as a device representation service, data storage, and computing processing features. Services operating in the device management service 810 may communicate data and messages to the devices 830 in response to requests from the devices 830 and/or in response to computing operations within the services.

The device management service 810 may comprise communicatively coupled component systems 840, 842, 846, 850 and 870 that operate to provide services to the devices 830. The gateway server 840 may be configured to provide an interface between the devices 830 and the device management service 810. The gateway server 840 receives requests from the devices 830 and forwards corresponding data and messages to the appropriate systems within the device management service 810. Likewise, when systems within the device management service 810 attempt to communicate data instructions to the devices 830, the gateway server 840 routes those requests to the correct device 830.

The gateway server 840 may be adapted to communicate with varied devices 830 using various different computing and communication capabilities. For example, the gateway server 840 may be adapted to communicate using either TCP (Transmission Control Protocol) or UDP (User Datagram Protocol) protocols. Likewise, the gateway server 840 may be programmed to receive and communicate with the devices 830 using any suitable protocol including, for example, MQTT, CoAP, HTTP, and HTTPS. The gateway server 840 may be programmed to convert the data and instructions or messages received from the devices 830 into a format that may be used by other server systems comprised in the device management service 810. In one example, the gateway server 840 may be adapted to convert a message received using the HTTPS protocol into a JSON formatted message that is suitable for communication to other servers within the device management service 810.

The gateway server 840 may store, or may control the storing, of information regarding the devices 830 that have formed a connection to the particular gateway server 840 and for which the particular gateway server 840 may be generally relied upon for communications with the device 830. In one example, the gateway server 840 may have stored thereon information specifying the particular device 830 such as a device identifier. For each connection established from the particular device 830, the gateway server 840 may also maintain information identifying the connection. For example, a connection identifier may be generated and stored for each connection established with a particular device 830. Information relating to the particular connection may also be stored. For example, information identifying the particular socket of the gateway server 840 on which the connection was established, as well as information identifying the particular protocol used by the device 830 on the connection may be stored by the gateway server 840. Information such as the socket and protocol may be used in order to facilitate further communications via the particular connection.

In one example, the gateway server 840 may communicate via any suitable networking technology with a device registry server 842. The device registry server 842 may be adapted to track the attributes and capabilities of each device 830. In an example, the device registry sever 842 may be provisioned with information specifying the attributes of the devices 830. The device registry server 842 may comprise data specifying rules or logic (e.g., automation rules) for handling various requests that may be received from the devices 830. The device registry server 842 may be programmed to convert specialized device functions or commands received in particular communication protocols such as, for example HTTPS, MQTT, CoAP, into functions or commands using particular protocols that are understood by other of the servers in the device management service 810. In one example, the device registry server 842 may be provisioned with information specifying that upon receipt of a particular request from a particular device 830, a request should be made to store the payload data of the request in a particular network service server 850. The device registry server 842 may be similarly programmed to receive requests from servers 842, 850 and convert those requests into commands and protocols understood by the devices 830.

The region services server 870 hosts the region communication service, a device migration service, and a token authentication and authorization service. These services perform the functions described earlier. The device security server 846 maintains security-related information for the devices 830 that connect to the device management service 810. The device security server 846 may perform the functions of the authentication and authorization service described earlier. In one example, the device security server 846 may be programmed to process requests to register devices 830 with the device management service 810. For example, entities such as device manufacturers, may forward requests to register devices 830 with the device management service 810. The device security server 846 receives registration requests and assigns unique device identifiers to devices 830 which use the device identifiers on subsequent requests to access the device management service 810. The device security server 846 stores, for each registered device, authentication information that may be provided during the device registration process. For example, a request to register a device 830 may comprise information identifying the device 830 such as a device serial number and device attributes, which may be managed separately from authentication information used to authenticate the device 830. In one example, authentication information may comprise a digital certificate and may comprise a public key of a public key-private key pair. The authentication information may be stored in relation to a device 830, multiple devices 830, a resource, or multiple resources. When the device 830 subsequently attempts to access the device management service 810, the request may be routed to the device security server 846 for evaluation. The device security server 846 determines whether authentication information stored in relation to the device 830, or a resource requested by the device 830, is valid.

The device security server 846 may be further programmed to process requests to associate particular entities (individuals or organizations) with particular devices 830. The device security server 846 may be adapted to receive requests to register entities, which may be, for example, individuals, users, accounts, and/or organizations, as authorized to control or communicate with a particular device 830. In one example, a request may be received from an individual or organization that may have purchased a device 830 from a manufacturer. For example, the device 830 may be a dishwasher, thermostat, or lighting assembly that an individual or organization purchased from the manufacturer. The individual or organization may initiate a request to register the device 830 with the individual or an organization with which the organization is associated. The request may be routed to a web services server which may be comprised in device management service 810 or which communicates the request to the device management service 810. The request identifies the device 830 and the particular entity (individual or organization) that is requesting to be associated with the device 830. In one example, the request may comprise a unique device identifier that was assigned when the device 830 was registered with the system. The request further may comprise information uniquely identifying the entity that is registering as having authority to communicate with and/or control the particular device 830.

The device security server 846 stores the information identifying the particular entity in relation with the device identifier. When the particular entity subsequently attempts to control or communicate data to the particular device 830, the device security server 846 may use the information to confirm that the particular entity is authorized to communicate with or control the particular device 830. When an entity that has not been registered as being authorized to communicate with the device 830 attempts to communicate with or control the device 830, the device security server 846 may use the information stored in the device security server 846 to deny the request.

A network services server 850 may be any resource or processing server that may be used by any of servers 840, 842, 846, or 870 in processing requests from the devices 830. In one example, network services server 850 may provide data storage and retrieval services and/or on-demand processing capacity. In an example scenario, the network services server 850 may be any of numerous network accessible services including, for example, web or cloud-based services. In one example, the web services server 850 may be programmed to provide particular processing for particular devices 830 and/or groups of devices 830. For example, a network services server 850 may be provisioned with software that coordinates the operation of a particular set of devices 830 that control a particular manufacturing operation.

Servers 840, 842, 846, 850, and 870 may be communicatively coupled via any suitable networking hardware and software. For example, the servers may communicate via a local area network or wide area network.

An external system 860 may access device management service 810 for any number of purposes. In one example, an external system 860 may be a system adapted to forward requests to register devices 830 with the device management service 810. For example, an external system 860 may include a server operated by or for a device manufacturer that sends requests to device management service 810, and device security server 846 in particular, to register devices 830 for operation with device management service 810. Similarly, the external system 860 may be a system operated to provide a gateway for entities (individuals or organizations) to register an ownership or control relationship with a particular device 830.

The devices 830 may be any devices that may be communicatively coupled via a network 820 with the device management service 810. For example, the devices 830 may be computing devices such as smart phones and tablet computers, automobiles, appliances such as washers and driers, industrial sensors, switches, control systems, etc. In one example, each of devices 830 may communicate over the network 820 to store data reflecting the operations of the particular device 830 and/or to request processing provided by, for example, network services server 850. While FIG. 8 depicts three devices 830, it will be appreciated that any number of devices 830 may access the device management service 810 via the gateway server 840. Further it will be appreciated that the devices 830 may employ various different communication protocols. For example, some devices 830 may transport data using TCP, while others may communicate data using UDP. Some devices 830 may use MQTT, while others may use CoAP, and still others may use HTTPs. It will also be appreciated that each of devices 830 may be programmed to send and receive particular functions or commands in its requests that are not compatible with other devices or even the systems within device management service 810. The gateway server 840 may be programmed to receive and, if needed, attend to converting such requests for processing with the device management service 810.

Figure 9:
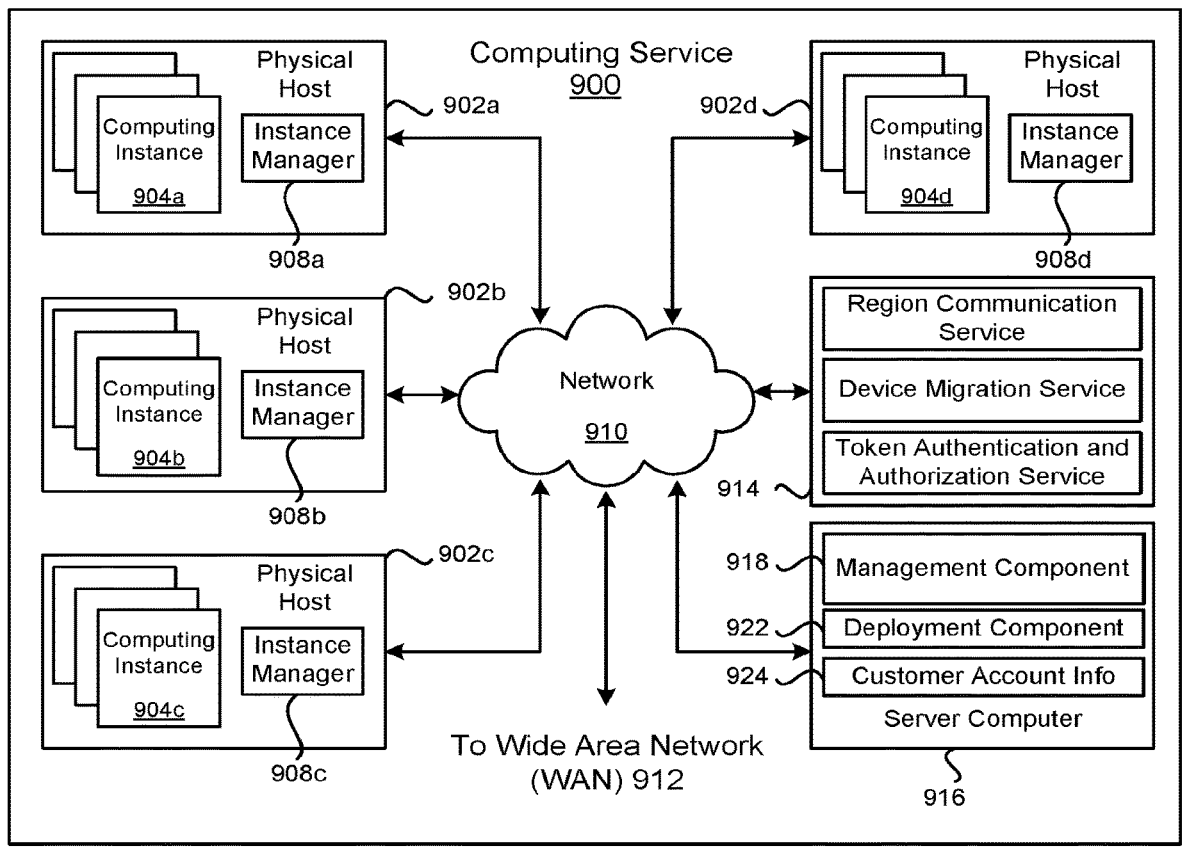
FIG. 9 is a block diagram that illustrates an example computing service environment that includes a region communication service and an identity token authentication and authorization service.

FIG. 9 is a block diagram illustrating an example computing service 900 that may be used to execute and manage a number of computing instances 904*a-d*. In particular, the computing service 900 depicted illustrates one environment in which the technology described herein may be used. The computing service 900 may be one type of environment that includes various virtualized service resources that may be used, for instance, to host computing instances 904*a-d*.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service 900 without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902/904*a-d*. While four server computers are shown, any number may be used, and large data centers may include thousands of server computers. The computing service 900 may provide computing resources for executing computing instances 904*a-d*. Computing instances 904*a-d* may, for example, be virtual machines. A virtual machine may be an instance of a software implementation of a machine (i.e. a computer) that executes applications like a physical machine. In the example of a virtual machine, each of the server computers 902/904*a-d* may be configured to execute an instance manager 908*a-d* capable of executing the instances. The instance manager 908*a-d* may be a hypervisor, virtual machine monitor (VMM), or another type of program configured to enable the execution of multiple computing instances 904*a-d* on a single server. Additionally, each of the computing instances 904*a-d* may be configured to execute one or more applications.

One or more server computers 914 and 916 may be reserved to execute software components for managing the operation of the computing service 900 and the computing instances 904*a-d*. For example, a server computer 914 may execute the region communication service, the device migration service, and the token authentication and authorization service described earlier. In one example, the region communication service and the token authentication and authorization service may be hosted using computing instances 904*a-d*.

A server computer 916 may execute a management component 918. A customer may access the management component 918 to configure various aspects of the operation of the computing instances 904*a-d* purchased by a customer. For example, the customer may setup computing instances 904*a-d* and make changes to the configuration of the computing instances 904*a-d*.

A deployment component 922 may be used to assist customers in the deployment of computing instances 904*a-d*. The deployment component 922 may have access to account information associated with the computing instances 904*a-d*, such as the name of an owner of the account, credit card information, country of the owner, etc. The deployment component 922 may receive a configuration from a customer that includes data describing how computing instances 904*a-d* may be configured. For example, the configuration may include an operating system, provide one or more applications to be installed in computing instances 904a-d, provide scripts and/or other types of code to be executed for configuring computing instances 904a-d, provide cache logic specifying how an application cache should be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902/904a-d, 916. The network 910 may be a local area network (LAN) and may be connected to a Wide Area Network (WAN) 912 or the Internet, so that end customers may access the computing service 900. The network topology illustrated in FIG. 9 has been simplified, many more networks and networking devices may be utilized to interconnect the various computing systems disclosed herein.

Figure 10:
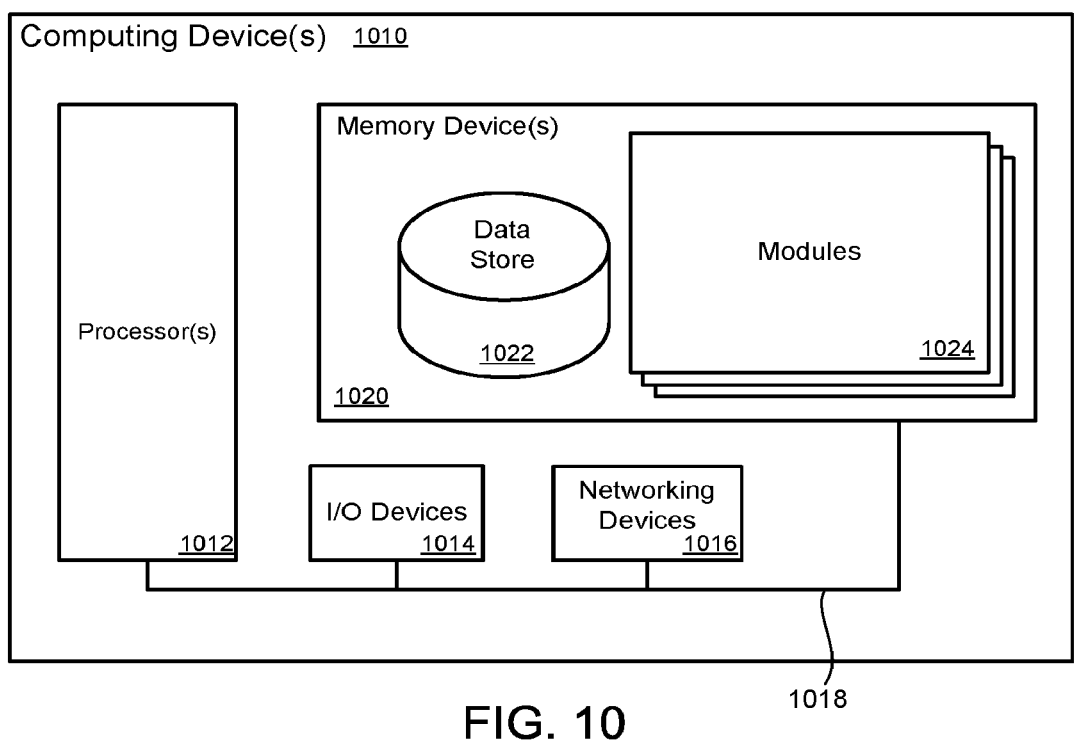
FIG. 10 is block diagram illustrating an example of a computing device that may be used to execute this technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high-level programming languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable storage medium storing thereon executable instructions that, as a result of being executed by one or more processors of a computer system, cause the computer system to:
   receive, from a device, a first request to access a computing resource in a first computing region, wherein the device is registered with the first computing region;
   authenticate the device at the first computing region using authentication credentials for the device;
   determine that the computing resource is unavailable in the first computing region but is available in a set of computing regions;
   select a second computing region from the set of computing regions based at least in part on a geolocation and a device policy of the device, wherein:
      the device policy indicates that device is unregistered with the second computing region but has permission to request access; and
      the geolocation indicates that the second computing region is in closer proximity to the device than another computing region of the set of computing regions; and
   as a result of selecting the second computing region:
      generate an identity token signed using an encryption key, wherein the identity token indicates permission for the device to access the computing resource in the second computing region; and
      provide the identity token and instructions to access the second computing region to the device, wherein the device presents the identity token to the second computing region with a second request to access the computing resource in the second computing region.

2. The non-transitory computer-readable storage medium of claim 1, wherein the executable instructions that, as a result of being executed by the one or more processors, cause the computer system to receive the encryption key from a key management service configured to provide the encryption key to the first computing region and the second computing region.

3. The non-transitory computer-readable storage medium of claim 2, wherein the key management service is further configured to periodically generate the encryption key and push the encryption key to the first computing region and the second computing region to synchronize the encryption key at the first computing region and the second computing region.

4. The non-transitory computer-readable storage medium of claim 1, wherein the encryption key is stored in a secure key repository.

5. The non-transitory computer-readable storage medium of claim 1, wherein the executable instructions further include instructions that, as a result of being executed by the one or more processors, cause the computer system to:
   authenticate the identity token; and
   determine that the device is authorized to have access to the second computing region based at least in part on the authentication of the identity token.

6. The non-transitory computer-readable storage medium of claim 5, wherein the authentication of the identity token is based at least in part on the encryption key.

7. A computer implemented method, comprising:
   receiving, from a device that is registered in a first computing region, a request to access a computing resource in the first computing region;
   authenticating the device associated with the request at the first computing region using authentication credentials for the device;
   determining that the computing resource is unavailable in the first computing region but is available in a plurality of computing regions;

identifying a second computing region from the plurality of computing regions based at least in part on a device policy received from the device and proximity of the device to the second computing region compared to the proximity to the plurality of computing regions, wherein the device policy includes a permission that permits the device to request access despite being unregistered in the second computing region; and as a result of identifying the second computing region:
generating an identity token signed using an encryption key, wherein the identity token indicates permission for the device to access the second computing region; and providing the identity token and instructions to access the second computing region to the device, wherein the device presents the identity token to the second computing region.

8. The method of claim 7, further comprising:
authenticating the identity token; and
as a result of authenticating the identity token, indicating that the device is authorized to transmit a second request to access the computing resource in the second computing region.

9. The method of claim 7, wherein the comparison used to identify the second region is executed based, at least in, part on location coordinates or location name of the device.

10. The method of claim 7, further comprising determining that the second computing region has capacity to handle the request.

11. The method of claim 7, wherein at least two of the plurality of computing regions includes the computing resource.

12. The method of claim 7, wherein the identity token is a temporary token that expires after a predetermined amount of time, after a one-time communication session with the second computing region, or after an occurrence of an event.

13. The method of claim 7, further comprising determining that a device policy for the device includes an operation permission that allows the device to request the computing resource to perform an operation requested by the device.

14. A system comprising:
at least one hardware processor; and
memory including instructions that, as a result of being executed by the one or more processors, cause the system to:
receive, from a device, a request to access a computing resource in a first computing region, wherein the device is registered in the first computer region;
authenticate the device associated with the request at the first computing region using authentication credentials for the device;
determine that the computing resource is unavailable in the first computing region but is available in a group of computing regions;
selecting a second computing region among the group of computing regions based at least in part on a location of the device and a device policy received from the device, wherein the device policy indicates that the device is unregistered in the second computing region yet able to request access to the second computing region, the location of the device indicating that the second computing region is in closer proximity to the device than another computing region of the group of computing regions; and
as a result of selecting the second computing region:
generate an identity token signed using an encryption key, wherein the identity token indicates permission for the device to access the second computing region; and
provide the identity token and instructions to access the second computing region to the device, wherein the device presents the identity token to the second computing region.

15. The system of claim 14, further comprising instructions that, as a result of being executed by the one or more processors, cause the system to determine whether to migrate the device from the first computing region to the second computing region based at least in part on a transfer criteria for transferring device data.

16. The system of claim 15, wherein the transfer criteria comprises at least one of a geolocation of the device, a latency value associated with transferring the device data to the second computing region, or a cost associated with transferring the device data to the second computing region.

17. The system of claim 15, further comprising instructions that, as a result of being executed by the one or more processors, cause the system to:
generate a registration record in a device registry for the second computing region; and
as a result of generating the registration record in the device registry for the second computing region, transmit a request to remove a registration record for the first computing region.

18. The system of claim 14, further comprising instructions that, as a result of being executed by the one or more processors, cause the system to generate a determination of distributing requests received at the first computing region between the first computing region and the second computing region.

19. The system of claim 18, wherein the determination of distributing requests to the second computing region is based at least in part on negotiations between the first computing region and the second computing region.

20. The system of claim 18, wherein the determination of distributing requests to the second computing region is based at least in part on load balancing among multiple regions, a volume of network traffic at the first computing region, or a performance degradation of a computing resource at the first computing region.

\* \* \* \* \*